United States Patent
Haney

(10) Patent No.: US 10,326,803 B1
(45) Date of Patent: Jun. 18, 2019

(54) SYSTEM, METHOD AND APPARATUS FOR NETWORK SECURITY MONITORING, INFORMATION SHARING, AND COLLECTIVE INTELLIGENCE

(71) Applicant: THE UNIVERSITY OF TULSA, Tulsa, OK (US)

(72) Inventor: Michael Haney, Tulsa, OK (US)

(73) Assignee: The University of Tulsa, Tulsa, OK (US)

( * ) Notice: Subject to any disclaimer, the term of this patent is extended or adjusted under 35 U.S.C. 154(b) by 39 days.

(21) Appl. No.: 14/734,788

(22) Filed: Jun. 9, 2015

Related U.S. Application Data

(60) Provisional application No. 62/031,023, filed on Jul. 30, 2014.

(51) Int. Cl.
*H04L 29/06* (2006.01)

(52) U.S. Cl.
CPC .......... *H04L 63/30* (2013.01); *H04L 63/0435* (2013.01); *H04L 63/06* (2013.01); *H04L 63/1425* (2013.01)

(58) Field of Classification Search
CPC . H04L 63/0435; H04L 63/06; H04L 63/1408; H04L 63/1425
USPC ........................................ 713/160, 165, 167
See application file for complete search history.

(56) References Cited

U.S. PATENT DOCUMENTS

| | | |
|---|---|---|
| 4,984,270 A | 1/1991 | LaBounty |
| 5,745,576 A | 4/1998 | Abraham et al. |
| 5,999,624 A | 12/1999 | Hopkins |
| 6,323,873 B1 * | 11/2001 | Liebenow ........... G06F 3/04897 345/619 |
| 6,754,662 B1 | 6/2004 | Li |

(Continued)

FOREIGN PATENT DOCUMENTS

| | | |
|---|---|---|
| CN | 1214583 | 4/1999 |
| WO | WO2008026212 | 3/2008 |

(Continued)

OTHER PUBLICATIONS

"PCAP Next Generation Dump File Format", L. Degioanni et al., RFC of IETF, Mar. 2004.*

(Continued)

*Primary Examiner* — Oleg Korsak
*Assistant Examiner* — Peiliang Pan
(74) *Attorney, Agent, or Firm* — Head, Johnson, Kachigian & Wilkinson, PC

(57) ABSTRACT

A system, method and apparatus for network security monitoring, information sharing and collective intelligence between and among at least a first central processing unit and at least a second central processing unit connected together by a network. The system includes a network interface device with hardware-based logic for recognizing and cataloging individual sessions, wherein the network interface card is in communication with the network. The network interface device includes onboard cryptographic key management components with symmetric key algorithms, an onboard packet encryption software module using derived keys to encrypt network packets, and software for storing encrypted copies of network packets as blocks. Third party analyst hardware and software derive keys necessary to retrieve encrypted network packets.

5 Claims, 11 Drawing Sheets

(56) References Cited

U.S. PATENT DOCUMENTS

| | | | |
|---|---|---|---|
| 7,249,585 B2 | 7/2007 | Kohn et al. | |
| 7,382,881 B2 | 6/2008 | Uusitalo et al. | |
| 7,434,069 B2 | 10/2008 | Nessler | |
| 7,609,721 B2 | 10/2009 | Rao et al. | |
| 7,769,858 B2 | 8/2010 | Cori, Jr. et al. | |
| 7,797,741 B2 | 9/2010 | Kim et al. | |
| 9,277,309 B2* | 3/2016 | Fino | H04R 1/1033 |
| 2001/0039873 A1* | 11/2001 | Yi | G10H 1/0041 |
| | | | 84/610 |
| 2002/0089427 A1* | 7/2002 | Aratani | G05B 19/0426 |
| | | | 340/12.26 |
| 2005/0118703 A1* | 6/2005 | Su | C12M 41/48 |
| | | | 435/286.1 |
| 2006/0072748 A1* | 4/2006 | Buer | G06F 21/72 |
| | | | 380/44 |
| 2006/0072762 A1* | 4/2006 | Buer | G06F 21/72 |
| | | | 380/277 |
| 2006/0133604 A1* | 6/2006 | Buer | H04L 63/045 |
| | | | 380/28 |
| 2006/0164396 A1* | 7/2006 | Anderson | G06F 3/0489 |
| | | | 345/172 |
| 2007/0070183 A1* | 3/2007 | Davis | H04M 1/72527 |
| | | | 348/14.02 |
| 2007/0192597 A1* | 8/2007 | Bade | G06F 21/57 |
| | | | 713/167 |
| 2008/0031478 A1* | 2/2008 | Alber | H04R 25/30 |
| | | | 381/315 |
| 2008/0189214 A1* | 8/2008 | Mueller | G06Q 20/20 |
| | | | 705/65 |
| 2008/0226080 A1* | 9/2008 | Li | G06F 21/57 |
| | | | 380/277 |
| 2008/0249801 A1* | 10/2008 | Zaleski | A61B 5/0006 |
| | | | 705/2 |
| 2009/0227234 A1* | 9/2009 | Bosch | H04L 63/0428 |
| | | | 455/411 |
| 2009/0319773 A1 | 12/2009 | Frenkel et al. | |
| 2010/0034383 A1 | 2/2010 | Turk | |
| 2010/0188212 A1* | 7/2010 | Jochelson | H04R 5/02 |
| | | | 340/540 |
| 2010/0329459 A1 | 12/2010 | Wiseman et al. | |
| 2011/0022204 A1* | 1/2011 | Hatfield | H04M 1/6025 |
| | | | 700/94 |
| 2011/0191161 A1* | 8/2011 | Dai | G06Q 20/204 |
| | | | 705/14.38 |
| 2011/0191624 A1* | 8/2011 | Rodgers | G06F 15/16 |
| | | | 714/4.11 |
| 2011/0211593 A1* | 9/2011 | Pepper | H04L 43/028 |
| | | | 370/474 |
| 2011/0289419 A1* | 11/2011 | Yu | G06F 9/44526 |
| | | | 715/738 |
| 2012/0051259 A1* | 3/2012 | Gintis | H04L 12/2697 |
| | | | 370/253 |
| 2012/0123222 A1* | 5/2012 | Chen | A61B 5/0002 |
| | | | 600/301 |
| 2012/0182891 A1 | 7/2012 | Lee et al. | |
| 2013/0198512 A1 | 8/2013 | Rubin et al. | |
| 2013/0212026 A1* | 8/2013 | Powell | G06Q 20/3823 |
| | | | 705/71 |
| 2013/0227689 A1* | 8/2013 | Pietrowicz | G01R 1/20 |
| | | | 726/23 |
| 2014/0139541 A1* | 5/2014 | Willaert | G09G 5/02 |
| | | | 345/589 |
| 2014/0149744 A1* | 5/2014 | Brier | H04L 9/0838 |
| | | | 713/171 |
| 2014/0188738 A1* | 7/2014 | Huxham | H04L 63/10 |
| | | | 705/73 |
| 2014/0301213 A1* | 10/2014 | Khanal | H04L 43/12 |
| | | | 370/248 |
| 2015/0142670 A1* | 5/2015 | Zloth | G06Q 20/22 |
| | | | 705/71 |
| 2015/0271150 A1* | 9/2015 | Barnett | H04L 63/0435 |
| | | | 713/171 |
| 2015/0295780 A1* | 10/2015 | Hsiao | H04L 43/022 |
| | | | 715/736 |
| 2015/0302397 A1* | 10/2015 | Kalgi | G06Q 20/36 |
| | | | 705/65 |

FOREIGN PATENT DOCUMENTS

| | | |
|---|---|---|
| WO | WO2009105981 | 9/2009 |
| WO | WO2010072179 | 7/2010 |

OTHER PUBLICATIONS

Posner, R. The Uncertain Protection of Privacy by the Supreme Court The Supreme Court Review, vol. 1979(1979), pp. 173-216 The University of Chicago Press http://www.jstor.org/stable/3109570.

Beaney, W. The Constitutional Right to Privacy in the Supreme Court The Supreme Court Review, vol. 1962(1962), pp. 212-251 The University of Chicago Press http://www.jstor.org/stable/3108796.

McCanne, S. and Jacobson, V. The BSD Packet Filter: A New Architecture for User-Level Packet Capture 1993 Winter USENIX—Jan. 25-29, 1993—San Diego, CA.

Lyon, D. Surveillance as Social Sorting; Privacy, Risk and Digital Discrimination London and New York Routledge Taylor & Francis Group.

Pramsteller, et al. "Efficient AES Implementation on ASICs and FPGAs", Advanced Encryption Standard—AES AES, 2005, Springer, p. 98-112.

Fedyukin, A. Keeping Track of Network an Inexpensive and Flexible Solution Presented to the faculty of Russ College of Engineering and Technology of Ohio University Nov. 2005.

Feldhofer, M., et al. AES Implementation on a Grain of Sand Jun. 2005; IEE Proceedings online No. 20055006.

Muresan, R., et al. Power-Smart System-On-Chip Architecture for Embedded Cryptosystems University of Guelph, School of Engineering, Guelph, Canada N1G 2W1 Sep. 19-21, 2005.

Bianchi, G., et al. Towards Privacy-Preserving Network Monitoring: Issues and Challenges The 18th Annual IEEE International Symposium on Personal, Indoor and Mobile Radio Communications (PIMRC'07).

Nanda, S., et al. Dynamic Multi-Process Information Flow Tracking for Web Application Security Computer Science Dept., Stony Brook University, Stony Brook, NY 11794; Rether Networks, Inc.

Corwin, E. Deep Packet Inspection: Shaping the Internet and the Implications on Privacy and Security Information Security Journal: A Global Perspective, 20:311-316, 2011 Copyright Taylor & Francis Group, LLC.

American National Standard for Financial Services ANS X9.24-1:2009; Retail Financial Services Symmetric Key Management Part 1: Using Symmetric Techniques Approved: Oct. 13, 2009; Accredited Standards Committee X9, Inc.

Michael Haney Inventor's Comments on Prior Art from Patent Search.

Samuel Warren and Louis Brandeis Harvard Law Review; 1890.

Diffie, W. and Landau, S. Privacy on the Line: the Politics of Wiretapping and Encryption 1998; The MIT Press: Cambridge, MA.

Fuchs, Christian Implications of Deep Packet Inspection (DPI) Internet Surveillance for Society 2012; The Privacy & Security Research Paper Series, Issue #1.

Ribeiro, B.F., Weifeng, C., Miklau, G. and Towsley, D. Analyzing Privacy in Enterprise Packet Trace Anonymization UMass CMPSCI Technical Report 48-07 Sep. 2007.

Allman, M., Kreibich, C., Paxson, V., Sommer, R. and Weaver, N. Principles for Developing Comprehensive Network Visibility HotSec; Jul. 2008.

Amann, B., Sommer, R., Sharma, A. and Hall, S. A Lone Wolf No More: Supporting Network Intrusion Detection with Real-Time Intelligence Research in Attacks, Intrusions, and Defenses; 2012; Springer; p. 314-333.

(56) References Cited

OTHER PUBLICATIONS

Pfeifer, Joseph W. Network Fusion: Information and Intelligence Sharing for a Networked World Homeland Security Affairs; vol. 8, Article 17; Oct. 2012; www.HSAJ.org.
Veselý, V. Extended Comparison Study on Merging PCAP Files Proceedings of the 18th Conference Student EEICT; 2012; vol. 2012; Faculty of Information Technology, Brno University of Technology.
Dgeioanni, L., Risso, F. and Varenni, G. PCAP Next Generation Dump File Format PCAP-DumpFileFormat Copyright © The Internet Society; 2004.
Gennuso, K. Shedding Light on Security Incidents Using Network Flows SANS Reading Room 2012.
Lam, L.C. and Chiueh, T.-c. A General Dynamic Information Flow Tracking Framework for Security Applications Computer Security Applications Conference; ACSAC'06; 22nd Annual; 2006; IEEE.
Gates, C., Collins, M., Duggan, M., Kompanek, A. and Thomas, M. More Netflow Tools for Performance and Security; 2004 LISA XVIII—Nov. 14-19, 2004—Atlanta, Georgia.
Claise, B. Cisco Systems Netflow Services Export Version 9 Oct. 2004 Copyright © The Internet Society; 2004.
Phaal, P., Panchen, S. and McKee, N. InMon Corporation's sFlow: A Method for Monitoring Traffic in Switched and Routed Networks 2001, RFC 3176 Copyright © The Internet Society; 2001.
Poznyakoff, Sergey GNU cflow Published by the Free Software Foundation Copyright © 2005, 2010 Sergey Poznyakoff.
Quittek, J., Zseby, T., Claise, B., and Zander, S. Requirements for IP Flow Information Export (IPFIX) Oct. 2004; Copyright © The Internet Society 2004 https://tools.ietf.org/html/rfc3917.
Sadasivan, G., Brownlee, N., Claise, B. and Quittek, J. Architecture for IP Flow Information Export 2009; Copyright © 2009 IETF Trust and the persons identified as the document authors. All rights reserved.
Trammell, B.H. and Boschi, E. Bidirectional Flow Export Using IP Flow Information Export (IPFIX) Jan. 2008.
Bellare, M., Canetti, R. and Krawczyk, H. Keying Hash Functions for Message Authentication Advances in Cryptology—CRYPTO'96 Proceedings, Lecture Notes in Computer Science vol. 1109, N. Koblitz ed., Springer-Verlag; Jun. 1996.
Chen, Lily; NIST SP800-108: Recommendation for Key Derivation Using Pseudorandom Functions (Revised) Computer Security Division Information Technology Laboratory; Dept. of Commerce Oct. 2009.
Chen, Lily NIST SP800-56C: Recommendation for Key Derivation Through Extracation-then-Expansion Computer Security Division Information Technology Laboratory; Dept. of Commerce Nov. 2011.
Parelkar, Milind M. Authenticated Encryption in Hardware George Mason University Fairfax, VA; Fall 2005.
Blakely, G.R. Safeguarding Cryptographic Keys National Computer Conference; 1979.
Shamir, A. How to Share a Secret Communications of the ACM; Nov. 1979; vol. 22; No. 11; p. 612-613.
Dwoskin, Jeffrey S. and Lee, Ruby B. Hardware-Rooted Trust for Secure Key Management and Transient Trust 2007.
Hodjat, Alireza and Verbauwhede, Ingrid A 21.54 Gbits/s Fully Pipelined AES Processor on FPGA Proceedings of the 12th Annual IEEE Symposium on Field-Programmable Custom Computing Machines (FCCM'04).
Järvinen, Kimmo, Tommiska, M. and Skyttä, J. Comparative Survey of High-Performance Cryptographic Algorithm Implementations on FPGAs IEE Proceedings—Information Security, vol. 152, No. 1, Oct. 2005, pp. 3-12 2005 The Institution of Engineering and Technology (IET).
Kuo, Henry and Verbauwhede, Ingrid Architectural Optimization for a 1.82Gbits/sec VLSI Implementation of the AES Rijndael Algorithm Cryptographic Hardware and Embedded Systems—CHES 2001; Springer-Verlag Berlin Heidelberg 2001.
Skalvos, N. and Koufopavlou, O. Implementation of the SHA-2 Hash Family Standard Using FPGAs; The Journal of Supercomputing, 31, p. 227-248; 2005.
Federal Information Processing Standards Publication 197 (FIPS) Advanced Encryption Standard (AES) Nov. 26, 2001.
Daemen, Joan and Rijmen, Vincent AES Proposal: Rijndael First Advanced Encryption Standard (AES) Conference; 1998.
Daemen, Joan and Rijmen, Vincent The Design of Rijndael: AES-The Advanced Encryption Standard Springer; 2002.

* cited by examiner

| Algorithm | Code | Option | Digest Size |
|---|---|---|---|
| 2's compliment | 0x0000 | 0x0000 | packet size |
| XOR | 0x0001 | 0x0000 | 1-4 bytes?? |
| CRC32 | 0x0002 | 0x0000 | 4 bytes |
| MD5 | 0x0003 | 0x0000 | 128-bit |
| SHA-1 | 0x0004 | 0x0000 | 160-bit |
| SHA-2 | 0x0005 | 0x0001 | 224-bit |
| SHA-2 | 0x0005 | 0x0002 | 256-bit |
| SHA-2 | 0x0005 | 0x0003 | 384-bit |
| SHA-2 | 0x0005 | 0x0004 | 512-bit |
| Whirlpool | 0x0006 | 0x0000 | 512-bit |
| RIPEMD | 0x0008 | 0x0000 | 160-bit |
| SHA-3 | 0x0007 | 0x0001 | 512-bit |
| HMAC-MD5 | 0x0103 | 0x0000 | 128-bit |
| HMAC-SHA-1 | 0x0104 | 0x0000 | 160-bit |
| HMAC-SHA-2 | 0x0105 | 0x0001 | 224-bit |
| HMAC-SHA-2 | 0x0105 | 0x0002 | 256-bit |
| HMAC-Whirlpool | 0x0106 | 0x0000 | 512-bit |
| MAC-SHA-3 | 0x0107 | 0x0000 | ??? |

Figure 3

```
     0                   1                   2                   3
     0 1 2 3 4 5 6 7 8 9 0 1 2 3 4 5 6 7 8 9 0 1 2 3 4 5 6 7 8 9 0 1
    +-+-+-+-+-+-+-+-+-+-+-+-+-+-+-+-+-+-+-+-+-+-+-+-+-+-+-+-+-+-+-+-+
 0  |                    Block Type = 0x00000006                    |
    +---------------------------------------------------------------+
 4  |                      Block Total Length                       |
    +-+-+-+-+-+-+-+-+-+-+-+-+-+-+-+-+-+-+-+-+-+-+-+-+-+-+-+-+-+-+-+-+
 8  |                         Interface ID                          |
    +---------------------------------------------------------------+
12  |                       Timestamp (High)                        |
    +---------------------------------------------------------------+
16  |                        Timestamp (Low)                        |
    +---------------------------------------------------------------+
20  |                         Captured Len                          |
    +---------------------------------------------------------------+
24  |                          Packet Len                           |
    +-+-+-+-+-+-+-+-+-+-+-+-+-+-+-+-+-+-+-+-+-+-+-+-+-+-+-+-+-+-+-+-+
28  /                                                               /
    /                                                               /
    /                          Packet Data                          /
    /            /* variable length, aligned to 32 bits */          /
    /                                                               /
    /                                                               /
    /                                                               /
    +-+-+-+-+-+-+-+-+-+-+-+-+-+-+-+-+-+-+-+-+-+-+-+-+-+-+-+-+-+-+-+-+
    /                                                               /
    /                       Options (variable)                      /
    /                                                               /
    +-+-+-+-+-+-+-+-+-+-+-+-+-+-+-+-+-+-+-+-+-+-+-+-+-+-+-+-+-+-+-+-+
    |  opt_epb_hash_code = 0x0003   |  opt_epb_hash_length = 0x0024 |
    +-------------------------------+-------------------------------+
    | Hash Algorithm = 0x0005 (SHA2)| Hash Alg Opts = 0x0001 (256b) |
    +-------------------------------+-------------------------------+
    /                                                               /
    /                                                               /
    /                                                               /
    /                                                               /
    /              Hash value (variable e.g. 256-bits)              /
    /                                                               /
    /                                                               /
    /                                                               /
    /                                                               /
    +-+-+-+-+-+-+-+-+-+-+-+-+-+-+-+-+-+-+-+-+-+-+-+-+-+-+-+-+-+-+-+-+
    |         Option Code           |         Option Length         |
    +-------------------------------+-------------------------------+
    /                          Option Value                         /
    /            /* variable length, aligned to 32 bits */          /
    +-+-+-+-+-+-+-+-+-+-+-+-+-+-+-+-+-+-+-+-+-+-+-+-+-+-+-+-+-+-+-+-+
    /                                                               /
    /                       . . . other options . . .               /
    /                                                               /
    +-+-+-+-+-+-+-+-+-+-+-+-+-+-+-+-+-+-+-+-+-+-+-+-+-+-+-+-+-+-+-+-+
    |    end_of_options = 0x0000    |    options_length = 0x0000    |
    +-+-+-+-+-+-+-+-+-+-+-+-+-+-+-+-+-+-+-+-+-+-+-+-+-+-+-+-+-+-+-+-+
    |                      Block Total Length                       |
    +---------------------------------------------------------------+
```

Figure 4

```
|                        ... packet data ...                         |
+-+-+-+-+-+-+-+-+-+-+-+-+-+-+-+-+-+-+-+-+-+-+-+-+-+-+-+-+-+-+-+-+
|         OpCode == 0x0005         |       OpLength == 0x0014       |
+---------------------------------+--------------------------------+
/                                                                    /
/                  20 bytes of Unique Flow ID                        /
/                                                                    /
/                                                                    /
+-+-+-+-+-+-+-+-+-+-+-+-+-+-+-+-+-+-+-+-+-+-+-+-+-+-+-+-+-+-+-+-+
| OpCode opt_endofopt = 0x0000    |       OpLength == 0x0000       |
+-+-+-+-+-+-+-+-+-+-+-+-+-+-+-+-+-+-+-+-+-+-+-+-+-+-+-+-+-+-+-+-+
```

Figure 5

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                     Block Type = 0xD5555555                    |
+---------------------------------------------------------------+
|                       Block Total Length                       |
+-+-+-+-+-+-+-+-+-+-+-+-+-+-+-+-+-+-+-+-+-+-+-+-+-+-+-+-+-+-+-+-+
|   Flow Type    |               IPFIX options                   |
+-+-+-+-+-+-+-+-+-+-+-+-+-+-+-+-+-+-+-+-+-+-+-+-+-+-+-+-+-+-+-+-|
/                                                                /
/      Src IP 4 bytes for IPv4; 16 bytes (4 words) for IPv6      /
/                                                                /
/                                                                /
+-+-+-+-+-+-+-+-+-+-+-+-+-+-+-+-+-+-+-+-+-+-+-+-+-+-+-+-+-+-+-+-+
/                                                                /
/      Dst IP 4 bytes for IPv4; 16 bytes (4 words) for IPv6      /
/                                                                /
/                                                                /
+-+-+-+-+-+-+-+-+-+-+-+-+-+-+-+-+-+-+-+-+-+-+-+-+-+-+-+-+-+-+-+-+
|     Src Port or ICMP Type      |      Dst Port or ICMP Code    |
+-+-+-+-+-+-+-+-+-+-+-+-+-+-+-+-+-+-+-+-+-+-+-+-+-+-+-+-+-+-+-+-+
|                   Flow Start Time (high order)                 |
+---------------------------------------------------------------+
|                   Flow Start Time (low order)                  |
+-+-+-+-+-+-+-+-+-+-+-+-+-+-+-+-+-+-+-+-+-+-+-+-+-+-+-+-+-+-+-+-+
|                   Flow Stop Time (high order)                  |
+---------------------------------------------------------------+
|                   Flow Stop Time (low order)                   |
+-+-+-+-+-+-+-+-+-+-+-+-+-+-+-+-+-+-+-+-+-+-+-+-+-+-+-+-+-+-+-+-+
| Enc Type=0x01  | DUKPTOpts=0xA6|                               |
|----------------+---------------+                               |
|         Key Serial Number = 20 bytes   (18 from TRSM)          |
|0|                                                              |
|                                                                |
+-+-+-+-+-+-+-+-+-+-+-+-+-+-+-+-+-+-+-+-+-+-+-+-+-+-+-+-+-+-+-+-+
/                                                                /
/                       Options (variable)                       /
/                                                                /
+--------------------------------+-------------------------------+
| end_of_options = 0x0000        |   options_length = 0x0000     |
+-+-+-+-+-+-+-+-+-+-+-+-+-+-+-+-+-+-+-+-+-+-+-+-+-+-+-+-+-+-+-+-+
|                       Block Total Length                       |
+---------------------------------------------------------------+
```

Figure 6

| Protocols | Protocol Codes | Flow Type |
|---|---|---|
| ARP | | 1 |
| IPv4 + unknown | 4 | 4 |
| IPv6 + unknown | 6 | 6 |
| IPv4 + ICMP | 4 + 1 | 5 |
| IPv6 + ICMP | 6 + 1 | 7 |
| IPv4 + TCP | 4 + 6 | 10 |
| IPv6 + TCP | 6 + 6 | 12 |
| IPv4 + UDP | 4 + 17 | 21 |
| IPv6 + UDP | 6 + 17 | 23 |
| IPv4 + SCTP | 4 + 132 | 136 |
| IPv6 + SCTP | 6 + 132 | 138 |

Figure 7

```
/                                                                     /
/                 Flow ID / Key Serial Number                         /
+-+-+-+-+-+-+-+-+-+-+-+-+-+-+-+-+-+-+-+-+-+-+-+-+-+-+-+-+-+-+-+-+
|    total_pkts_code = 0x0002      |      op_length = 0x0004        |
+---------------------------------+---------------------------------+
|                    Number of packets in flow                      |
+-+-+-+-+-+-+-+-+-+-+-+-+-+-+-+-+-+-+-+-+-+-+-+-+-+-+-+-+-+-+-+-+
|    total_bytes _code = 0x0003    |      op_length = 0x0004        |
+---------------------------------+---------------------------------+
|                     Number of bytes in flow                       |
+---------------------------------+---------------------------------+
|    end_of_options = 0x0000       |    options_length = 0x0000     |
+-+-+-+-+-+-+-+-+-+-+-+-+-+-+-+-+-+-+-+-+-+-+-+-+-+-+-+-+-+-+-+-+
```

Figure 8

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                    Block Type = 0xAAAAAAAA                    |
+---------------------------------------------------------------+
|                       Block Total Length                      |
+-+-+-+-+-+-+-+-+-+-+-+-+-+-+-+-+-+-+-+-+-+-+-+-+-+-+-+-+-+-+-+-+
|Enc Type = 0x01|DUKPT opts=0xA6| 16-bit first 2 bytes of MAC   |
+---------------+---------------+-------------------------------+
|              Next four bytes of sniffer's MAC address         |
+---------------------------------------------------------------+
|                 Org-defined Key Set Identifier (KSI)          |
+---------------------------------------------------------------+
|0| <- if this bit is "1" HALT                                  |
|              63 bits encryption transaction counter           |
+-+-+-+-+-+-+-+-+-+-+-+-+-+-+-+-+-+-+-+-+-+-+-+-+-+-+-+-+-+-+-+-|
|                         Encrypted Data                        |
|          / * variable length, byte-aligned * /                |
|                                                               |
|                                                               |
|   +-+-+-+-+-+-+-+-+-+-+-+-+-+-+-+-+-+-+-+-+-+-+-+-+-+-+-+-+-+ |
|   :      Embedded Block Type = 0x00000006                   | |
|   +-+-+-+-+-+-+-+-+-+-+-+-+-+-+-+-+-+-+-+-+-+-+-+-+-+-+-+-+-+ |
|   :                    EPB Total Length                     | |
|   +-+-+-+-+-+-+-+-+-+-+-+-+-+-+-+-+-+-+-+-+-+-+-+-+-+-+-+-+-+ |
|   :                                                         | |
|   :              Original Enhanced Packet Block             | |
|   :                 with HMAC hash option                   | |
|   :                                                         | |
|   :                                                         | |
|   +-+-+-+-+-+-+-+-+-+-+-+-+-+-+-+-+-+-+-+-+-+-+-+-+-+-+-+-+-+ |
|   |      hash of plaintext packet contained for later       | |
|   |                integrity verification                   | |
|   +-+-+-+-+-+-+-+-+-+-+-+-+-+-+-+-+-+-+-+-+-+-+-+-+-+-+-+-+-+ |
|   |                    EPB Total Length                     | |
|   +-+-+-+-+-+-+-+-+-+-+-+-+-+-+-+-+-+-+-+-+-+-+-+-+-+-+-+-+-+ |
|                              +--------------------------------+
|                              |    is padded by block cipher  |
+-+-+-+-+-+-+-+-+-+-+-+-+-+-+-+-+-+-+-+-+-+-+-+-+-+-+-+-+-+-+-+-+
|                       Block Total Length                      |
+---------------------------------------------------------------+
```

Figure 9

SYSTEM, METHOD AND APPARATUS FOR NETWORK SECURITY MONITORING, INFORMATION SHARING, AND COLLECTIVE INTELLIGENCE

CROSS-REFERENCE TO RELATED APPLICATIONS

This application claims priority to and the benefit of U.S. Provisional Patent Application Ser. No. 62/031,023, filed Jul. 30, 2014, which is herein incorporated in its entirety by reference.

BACKGROUND OF THE INVENTION

1. Field of the Invention

The present invention is directed to a system, method and apparatus for network security monitoring, information sharing and collective intelligence that provides a mechanism of assuring confidentiality and integrity of the collected data. The present invention is designed to provide privacy enhancements for network users (e.g. customers, employees, peers and citizens) while providing enhanced capabilities for recording network traffic (e.g. email, web browsing sessions, file sharing, voice and video calls) by network operators or monitoring personnel (e.g. company IT and/or security personnel, ISP and telecom operators, and government agencies).

2. Prior Art

Privacy is a concept as old as human civilization. It is an essential component of our western "free" society developed in a time long before computers dominated so much of our everyday lives. Privacy has been interpreted by the U.S. Supreme Court as encompassed by the First, Third, Fourth, Fifth, and Ninth Amendments. Privacy has been included in the United Nations' Declaration of Human Rights to be one of the inalienable rights of humans everywhere. Much has been written regarding legal interpretations of "the right to privacy", such as William Beaney's review of cases up to 1962 (see Beaney, W. M., "The Constitutional Right to Privacy in the Supreme Court", The Supreme Court Review, 1962, p. 212-251) and many updates to case history by 1979 reviewed by Posner (see Posner, R. A., "The Uncertain Protection of Privacy by the Supreme Court", The Supreme Court Review, 1979, p. 173-216). In fact, "the right to privacy" is often a difficult right to succinctly define and, hence, has generated much debate. The first formal treatise on the subject in the United States was presented by Samuel Warren and Louis Brandeis in the Harvard Law Review in 1890. Though privacy of citizens and, in general, of the "private sector" has not always been guaranteed in so-called free societies, violations of individuals' privacy have always been a part of totalitarian regimes in non-free societies. Monitoring a population is essential to oppressing it. Understanding what people are doing, with whom they are associating, and what they are thinking is central to controlling them. Surveillance may happen on many different scales, from employees and customers of small businesses or organizations, to whole populations both foreign and domestic.

Traditionally, protected private information includes financial records, such as salary and credit worthiness, and health records, such as communicable diseases. Such information, in the wrong hands, can be used to commit fraud or extortion, or simply for harassment and discrimination.

Now more than ever, it is too easy to erode personal privacy in irreversible ways, as more and more data is generated, collected, stored digitally, and ultimately leaked. See Bianchi, G., et al., "Towards privacy-preserving network monitoring: Issues and challenges", Personal, Indoor and Mobile Radio Communications (PIMRC), 2007, IEEE 18th International Symposium 2007; Corwin, E. H., "Deep Packet Inspection: Shaping the Internet and the Implications on Privacy and Security", Information Security Journal: A Global Perspective, 2011, 20(6): p. 311-316; Diffie, W. and Landau, S., "Privacy on the Line: the Politics of Wiretapping and Encryption", 1998, The MIT Press: Cambridge, Mass.; Fuchs, C., "Implications of Deep Packet Inspection (DPI) Internet Surveillance for Society", 2012; Lyon, D., "Surveillance as Social Sorting: Privacy, Risk and Automated Discrimination", 2002, Taylor & Francis; and Ribeiro, B. F. et al., "Analyzing Privacy in Enterprise Packet Trace Anonymization", NDSS, 2008. The present invention is intended to address at least one element of privacy and electronic surveillance: deep packet inspection (DPI).

Network Security Monitoring

On arguably equal footing with privacy needs is the need for network security monitoring. Computers have come to operate, monitor, and govern more and more aspects of our daily lives, from business records to factory automation. Modern communication networking has made the interconnection and interaction of these computers possible and, now, essential to their continued operation. There is very little that we are able to do without a network. By connecting to the Internet, we are not just connected to the systems with which we need to interact, but an extensively interconnected web of computer devices and machinery around the globe. This creates an inherent vulnerability to attackers and malicious users, as well as negligent employees and misconfigured security systems that place data at risk of exposure through network-based attacks.

It is essential that security professionals and analysts closely monitor these networks to detect and be able to respond to such attacks when they occur, or as soon thereafter as possible. One of the most important tools for creating this capability is recording network traffic so that it can be examined and analyzed after the fact. Many techniques over the last 20 years have been developed to monitor and record network-based traffic to store, reassemble, analyze, and interpret network activity and data to hunt for hackers. It would be desirable to support and expand network security monitoring with state-of-the-art capabilities while providing an appropriate balance with the need to preserve privacy.

Information Sharing and Collective Intelligence

One of the most important capabilities with regards to network security monitoring is that of sharing network recordings with other analysts and other organizations, including sharing between law enforcement, the Intelligence Community, and the private sector. See Allman, M. et al., "Principles for Developing Comprehensive Network Visibility", HotSec, 2008; Amann, B. et al., "A lone wolf no more: supporting network intrusion detection with real-time intelligence", Research in Attacks, Intrusions, and Defenses, 2012, Springer, p. 314-333; and Pfeifer, J. W., "Network Fusion: Information and Intelligence Sharing for a Networked World", Homeland Security Affairs, 2012.8. By using a standard format for network recording data, it is possible to develop tools for different types of analysis techniques. It is also possible to make network data recordings portable from the system on which they were collected to another system on which they can be reviewed and analyzed. Providing law enforcement access to raw network surveillance may generate court-admissible evidence that is crucial to the successful prosecution of criminals. However, with all the advantages of using an open standard for network traffic recordings come the additional challenges to preserving privacy of the network sessions of innocent people on these same networks.

It would be desirable to develop a method, a data structure, and a hardware architecture that create accelerated capabilities for network security monitoring, support better inter-organizational information sharing, and provide a novel application of encryption and key management to preserve privacy at a level not currently available.

Recording Network Traffic as PCAP

Whether for security analysis or operational support, network traffic is often recorded and analyzed "offline" in various ways using a sundry of tools. There are many specifications that have been created over the last several decades for recording traffic on packet-switched networks by storing on disk a copy of network-transmitted data. The de facto standard for raw network recording to a file system is called pcap (short for "packet capture"). See Jacobson, V., Leres, C., and McCanne, S., libpcap: Packet Capture Library, 1994, Lawrence Berkeley Laboratory, Berkeley, Calif., p. Initial public release. This format was developed as part of the tool tcpdump developed originally by the Lawrence Berkeley Laboratory Network Research Group in 1987. See Jacobson, V., Leres, C., and McCanne, S., tcpdump, 1989. The source code for this tool was released in the open, ported to multiple Unix-like operating system platforms, and extended in various ways by a number of different development efforts. See Carstens, T. a. H., "G. Programming with pcap", 2013 [cited 2013]; and Stevens, W. R., "UNIX Network Programming", Vol. 1, 2004, Addison-Wesley Professional.

In 1999, the website tcpdump.org was established so that various forms of the tool could be consolidated and reconciled, and the modern version of tcpdump was separated from the supporting OS-level library libpcap.so. It has also been extended to support BSD Packet Filters (BPF) (see McCanne, S. and Jacobson, V., "The BSD packet filter: A new architecture for user-level packet capture", USENIX Winter 1993 Conference, USENIX Association) for various protocol interpretations and pattern-matching capabilities. Most importantly, the tool was made to store a well-formed data file to hold a copy of streams of network traffic.

Libpcap has since been ported to the Windows OS as winpcap.dll, a Windows-compatible library designed to reproduce its capabilities of communicating with the OS's TCP/IP stack and sharing data in a standard format to user-space tools. The most notable of the Windows-based tools to use pcap-compatible files is Wireshark, an open-source network protocol analyzer which parses pcap files to identify a wide variety of network application protocols and make them searchable and viewable in a variety of ways. See Combs, G., Wireshark, http://www.wireshark.org, last modified 2007, p. 12-02.

Today, the vast majority of tools for network monitoring are built to either consume or produce pcap-based network recording files. Through the use of either libpcap.so or winpcap.dll, many tools have been developed to do various types of network monitoring, recording, metrics, and signature-matching, all with a common interoperable file format. This means that any one tool on any operating system can record network traffic, and any other security tool can then import this file for analysis, review, and reporting. This interoperability is a great benefit to network developers, engineers, and security analysts tasked with understanding digital network traffic of all types. However, there are some key shortcomings in the pcap file format which lead to the present invention.

PCAPNG File Format

Although pcap has been widely adopted, users and developers have complained of several key features which seem to be missing. Most of these shortcomings are not apparent until analysts attempt to share packet captures with one another. The greatest challenges arise when pcap files from multiple recording sessions or different observation points on the network must be merged. See Veselý, V., "Comparison Study on Merging PCAP Files", Proceedings of the 18th Conference Student EEICT 2012, Volume 2012, Faculty of Information Technology. The first problem occurs if the operating systems used to create the captures differ in endian-ness (i.e. the order of the sent and received byte streams. This terms applies to the interpretation of fields of raw data and whether one is receiving the big end of the byte first ("big-endian systems") or the little end of the byte ("little-endian systems"). Libpcap is designed to rely on the host OS to determine if packets are processed in big-endian or little-endian order, writing its output accordingly. Though packet contents are written in the byte order as they are received from the network, the timestamps and link-layer information added by libpcap will change byte order based on the OS. See Carstens and Garcia, ibid. So, it is not generally possible to merge packet capture files from a Solaris SPARC system with a Linux x86 system, for example.

Pcap files begin with some information about the device used to generate the capture. However, for simultaneous or overlapping pcap files that must be merged, this information will only be available from one of the original files. See Veselý, ibid. Also, the pcap file lacks information regarding the recording environment parameters, such as limited snapshot length that may lead to packets being cropped from their original size. There is no indication in the pcap file if segments of the network may have been ignored or filtered out at the time of the recording (e.g., by supplying a BPF filter).

One of the major data elements present in pcap files is a timestamp for each packet. This is not an inherent part of the original network traffic. All packets traversing a network are essentially live and "real time". Timestamps become critical when traffic is recorded for later review, shared between applications, merged with other files, or otherwise analyzed "offline". When using libpcap (or winpcap) to generate pcap files, timestamps are recorded accurate to microseconds ($10^{-6}$ seconds). While this has been adequate for many LAN networks over the years, as analysts begin to monitor 1 Gbps and 10 Gbps (and faster) Ethernet networks, this time resolution is woefully inadequate to provide the true chronological order of many frames that would appear to have arrived simultaneously.

In order to address these and other shortcomings of the pcap file format, a working group consisting of a number of contributing Wireshark and libpcap developers proposed a new file standard in 2004 called PcapNG (pcap "next generation"). See Degioanni, L., Risso, F., and Varenni, G., PCAP Next Generation File Format, 2004. This format is designed to be extensible and support a number of features requested by the network analysis community. In PcapNG files, packets are stored as blocks with clearly distinguishable headers and footers. As an immediate benefit, searching and filtering in PcapNG files is significantly faster. Different blocks are defined for a number of different attributes and features of the network recording. An interface description block ("IDB") is defined to describe the interface that the recording comes from, and multiple IDB sections may appear in a single PcapNG file. Timestamping is improved to a 64-bit time unit. Comments regarding packets may be added directly to the file. Name resolution, which may change based on point-of-observation of a network trace for a given set of IP addresses (e.g., such as those designated as private by IETF RFC 1918), can also be included in blocks within the PcapNG file.

Other extensible metadata can be provided for given packets in similarly defined blocks within the file. Many extensions have already been proposed, but most are listed as "experimental" and remain undefined. One such proposed extension, for which a clear definition is herein presented, is an Encrypted Block. The standard's authors describe this as something which may be desirable, but is left as a "TO DO" item in the currently published standard.

The present invention depends on enhancements and extensions to the PcapNG file format. Enhancements include a clearly defined encryption block standard as a means for providing privacy within network recordings. Two additional packet block types in the PcapNG standard are defined for supporting network flow identification and mapping flows to encryption keys. These enhancements, as designed by the inventor, are included in this description but are excluded from the claims of the present invention.

Network Flows and IPFIX

Recording network-based packets via pcap allows for a great deal of flexibility with regards to the type of analysis to be performed. Full packet capture allows for thorough inspection of every layer of network communications (in the sense of the OSI layering model of network communications), and is referred to as "deep packet inspection". See Fuchs, ibid. That is, application-specific data contained in the payloads of packets can be directly inspected as they are contained within the pcap recording. However, the sheer volume of network traffic often makes the review of every individual packet payload impractical. Session-based network analysis is often useful for determining what hosts and applications are communicating on a network, and the nature of that communication, without the need for application-layer details and analysis. Much can be discerned from a network packet's header without need for the details included in the payload. See Fedyukin, A. V., "Keeping Track of Network Flows: An Inexpensive and Flexible Solution", 2005, Ohio University; Gennuso, K., "Shedding Light on Security Incidents Using Network Flows", SANS Reading Room, 2012; Lam, L. C. and Chiueh, T.-c., "A general dynamic information flow tracking framework for security applications", Computer Security Applications Conference, ACSAC'06 22nd Annual, 2006, IEEE; and Nanda, S., Lam, L.-C., and Chiueh, T.-c., "Dynamic multi-process information flow tracking for web application security", Proceedings of the 2007 ACM/IFIP/USENIX international conference on Middleware companion, 2007, ACM.

Working with lower layers of network communication has always been necessary for network routing. Intermediate network routers and switches are concerned with the header information which instructs them on how to direct a packet to its next hop, and how various packets are related to others in the communication channel as a "stream" or "flow" of packets. Routers designed for high speed packet switching are not concerned with processing the contents of packet payloads, but merely how to classify packets generally, such as whether they belong to an internal/downstream interface or external/upstream interface. The history of computer networking is by-and-large a history of how to make that process faster. Thus, much work has been done to develop ways of rapidly identifying the nature of network traffic from its header.

Many tools have been developed that take a meta-data approach to network packet analysis to identify concerns by header data only without examining the contents of specific networked communications. These tools may make use of libpcap capabilities, or they may produce a session-, metric-, or flow-based variant of data formats (e.g., Argus (see Bullard, C., Argus, the network Audit Record Generation and Utilization System, June 2005), SiLK (see Gates, C., et al. "More Netflow Tools for Performance and Security", LISA, 2004), RMON and various SNMP-based tools (see Stallings, W., SNMP, SNMPv2, SNMPv3, and RMON 1 and 2, 1998, Addison-Wesley Longman Publishing Co., Inc.). The most widely-used standard for analyzing network traffic patterns and session metrics is called Netflow, a standard developed by Cisco to support measurement of network communications on their IOS devices (see Claise, B., Cisco systems NetFlow services export version 9, 2004). Cisco developed multiple versions of the format, with the most widely adopted being v5 and v9.

Many other networking equipment companies have imitated the Netflow specification with similar formats (e.g., "sflow" (see Phaal, P., Panchen, S., and McKee, N., InMon corporation's sFlow: A method for monitoring traffic in switched and routed networks, 2001, RFC 3176), "cflow" (see Poznyakoff, S., GNU cflow, 2005)) or have developed tools which can produce or consume Netflow-compatible data. The IETF has since produced a set of open standards colloquially referred to as "Netflow v10" but more properly called IPFIX—"Internet Protocol Flow Information eXport". See Quittek, J. et al., "Requirements for IP flow information export (IPFIX)", IETF RFC3917, October 2004; Sadasivan, G., "Architecture for IP flow information export", Architecture, 2009; and Trammell, B. H. and Boschi, E., "Bidirectional Flow Export Using IP Flow Information Export (IPFIX)", 2008. This standard, more than any other, provides the capabilities and the flexibility necessary to support network security monitoring tools with various degrees of network session analysis (e.g., IP-to-IP communication tracking, bits-per-second, packets-per-second, etc.).

There are also tools that will read in pcap network recordings and provide as output network flow data, including IPFIX. Generally, the application-layer payloads of network packets are stored in pcap files. But tracking of specific sessions can be done by hashing the packet headers to quickly identify a packet as belonging to one flow or another. IPFIX implementations provide a very sound method of doing so.

As specified in IETF RFC 3917, IPFIX defines the concept of a particular network flow as "a set of IP packets passing an observation point in the network during a certain time interval" and having "a set of common properties". See Quittek, ibid. This set of properties may be one or more of various packet header fields, characteristics of the packet itself, or fields derived from packet treatment (e.g., next hop IP address). This definition allows for a great deal of flexibility. IPFIX flows can be defined in templates which specify the functions that map these packet characteristics to flow identifiers.

The most straightforward definition is often referred to as the "classic 5-tuple" and consists of the source IP address, destination IP address, source port, destination port, and protocol identifier. See Fedyukin, ibid. This approach covers the most commonly observed network streams, including traditional IPv4 TCP or UDP traffic, as well as basic IPv6 traffic. However, it falls short when trying to group related ICMP or ARP traffic, traffic treated with MPLS labeling schemes, different types of streaming or multicast traffic, or fragments that may not include the original packet header distinguishing port numbers. There is also the question of identifying packets in bi-directional communications as separate or part of the same flow (when source and destination are swapped). Connectionless application sessions, such as HTTP web traffic, present another issue for flow identification. Generally, an analyst would want to consider all communications between a single web browser client and a single web server as part of one flow, but the source port used by the web browser may change many times.

One embodiment of the present invention is to track network flows by the classic 5-tuple header elements, where ICMP type and code are used in place of port numbers, and other protocols without port numbers may set these values to null. Another embodiment works by grouping all traffic between two IP addresses as related, or by a "3-tuple" or "4-tuple" of source IP address, destination IP address, transport protocol, and possibly destination port, which is often common for a given service (e.g. web on port 80, email on port 25, etc.). This scenario would account for web traffic in which multiple source ports are used between one client and one web server, but would typically be considered part of a single session (e.g. downloading image files as part of a single web page). Other schemes may suggest improvements for security purposes. See Fedyukin, Gennuso, Lam and Nanda, ibid., and Corl, Jr. et al. (U.S. Pat. No. 7,769,858); Kohn et al. (U.S. Pat. No. 7,248,585); and Li (U.S. Pat. No. 6,754,662).

Encryption and Cryptographic Key Management

Many people understand that encryption is somehow key to the protection of confidentiality and privacy in digital information. Few, however, understand the intricacies of the various encryption options available, and fewer still seem to understand how the management, sharing, and protection of encryption keys can easily lead to security compromises if not performed with due care. The present invention addresses some of these issues and makes use of a particular cryptographic key management approach which has proven to date to hold up to various attack scenarios and to the scrutiny of the cryptographic community. However, it is first necessary to address at a high level the reasons for the selection of this technology for providing a viable solution to the problem of privacy in network recordings.

Hashing for Data Integrity

An acceptable manner of providing assurance that recorded data has not been altered or tampered with involves storing (and protecting) a hash of the data. See Bellare, M., Canetti, R., and Krawczyk, H., "Keying hash functions for message authentication", Advances in Cryptology—CRYPTO'96, 1996, Springer. At a later time and in an independent manner, the hash can be regenerated and shown to match the one delivered with the data, thus demonstrating the message's authenticity. One of the key features of a "good" cryptographic hash function is that even small changes in the original data result in large discrepancies in the calculated hash. Another corollary feature of the hash's goodness is that it is highly improbable that two different data samples will produce the same hash. This is referred to as a collision. For network traffic recordings, the present invention uses an optional feature of Enhanced Packet Blocks (EPBs) in the PcapNG file format to store a hash of the original recorded packet. This is currently listed in the standard as a proposed option. See Degioanni, ibid.

However, in order to protect the integrity of the hash, it is also necessary to define an encryption of the packet and hash together. As defined, any malicious alteration of a packet could easily be accompanied by generation of a new hash to be stored in the packet block. By encrypting the packet with its hash, upon decryption, the packet's hash could be recalculated independently and compared to the (decrypted) stored value. This will verify the integrity of the packet within the PcapNG file. And because each packet can be validated independently, the PcapNG file can still be parsed, searched, split, or merged with others without concern for impacting the integrity of the recording. This would not be possible if the approach of providing a hash for the entire captured file were taken.

Asymmetric Versus Symmetric Encryption

As for encrypting network packets, there are essentially two options that provide a degree of confidentiality based on the security of a key used to encrypt the packets. Encryption can either be done using an asymmetric key pair, in which encryption is performed with one key and decryption is performed with another, or it can be performed symmetrically, in which both encryption and decryption are done with the same key. The former has the benefit of being able to share (in the "public") the encrypting key so that its exposure does not affect the security of the encrypted data. Only the private key needs to be protected. At first glance, an asymmetric encryption approach would seem to be the best choice for a scenario in which network traffic would be recorded, encrypted, and stored for later analysis. Recording devices could be deployed to multiple network locations, perhaps in widely dispersed geographic areas. The encryption would not be at risk of exposure, since decryption would presumably take place in one central management location, and the secret key could be more appropriately protected at that location (i.e., without the need for distribution).

However, asymmetric encryption is generally slower than a comparable strength symmetric key algorithm. In order to get a comparable strength of encryption (in terms of necessary computational time to recover the decryption key through a brute-force attack), asymmetric keys must be 10 to 20 times larger than their symmetric key counterparts. Moreover, asymmetric encryption must be done on fixed block sizes and is not easily performed on variable length streams of data. This can be overcome by padding all packets to be encrypted to their maximum allowable size, but this is highly inefficient. Finally, this approach will generally lead to all-or-nothing capabilities. That is, an entire network trace recorded in one location may be encrypted with the single public key, and can later be decrypted with a single private key. This does not provide for a more granular approach to encrypting separate network streams separately.

For these reasons, the present invention operates using symmetric key encryption. Such an approach provides comparable encryption strength with smaller key lengths, can handle streams with variable length inputs, and can be performed at network traffic wire speeds. Using a symmetric key algorithm has advantages, but with disadvantages that are immediately obvious. Because encryption and decryption is done with the same key, the key that must be present when the network traffic is recorded must also be present when it is to be decrypted and analyzed. This is either done by using pre-shared secret keys or through some means of key exchange, which protects the keys with even greater security than is used to protect the network recordings.

There is also the problem of key reuse. Cryptanalysis can be performed given enough encrypted traffic is captured and some ciphertext to plaintext is known (e.g., common values and formats of TCP SYN-SYN/ACK-ACK handshakes), and encryption keys can be recovered if they are reused too many times. Thus, another necessary feature of a network recording encryption scheme is the use of a key stream, rather than a single key. By producing a stream of keying material that can be made as long as the plaintext to be encrypted, one can effectively produce a one-time pad to encrypt the data. There are several schemes for producing such a stream, but few will provide a solution that meets the other requirements.

Key Management Problems

The most complicated problem when discussing encryption solutions for network recordings is key management. Once it is clear that many keys will need to be produced to support encryption of multiple network streams and recordings, how to manage these keys securely becomes the next challenge. This is an often overlooked problem of effective use of encryption. We may trust the soundness of the mathematics upon which a cryptographic algorithm is based, but how do we trust that keys will not be lost, shared, copied, or stolen?

Sharing and copying key materials puts the keys at risk, and thus the confidentiality of the encrypted data is weakened by this exposure. The solution, which may not present itself at first, but seems obvious when examined, is to never copy or transmit the keys at all. That is, one way to reduce or eliminate the risk of secret keys being disclosed is to not allow them to exist outside of the encryption and decryption systems. In such a scheme, a "master" key may be shared between the encryption and decryption systems at time of creation or initialization, and never subsequently transmitted or copied. This initial key may be used to derive working keys to perform encryption and decryption. By deriving the keys in a formulaic manner, they can be reproduced later given the same starting parameters, and thus never need to be copied, stored, or transferred. Hence, keys may be destroyed after they are generated and used for encryption. See Chen, L., NIST SP800-108: Recommendation for Key Derivation Using Pseudorandom Functions, 2009; and Chen, L., NIST SP800-56C: Recommendation for Key Derivation through Extracation-then-Expansion, 2011.

DUKPT: Derived Unique Key Per Transaction

The problems and trade-offs of various encryption schemes have been studied and well documented over the years, and there are generally well understood solutions to problems of sharing information over a network or storing information securely for later decryption. Yet for the problem of recording network traffic and encrypting distinct network flows separately, a promising solution comes not from the realm of network security, but from that of financial transaction security. In financial services, specifically in retail, data (e.g., credit card data) must be captured in remote locations (e.g., point-of-sale locations) and transmitted securely back to a central location (e.g., a payment processor) to be decrypted. The credit card brands, led by Visa and MasterCard, require that all credit card transactions sent over public networks for processing be encrypted. Furthermore, all such transactions must be protected individually, such that if a single encryption key were exposed, no other keys would be affected. Additionally, they require that all encryption performed by remote devices, which may be in untrusted locations, be tamper-resistant so that key material stored in physical devices are not at risk of exposure.

The solution to address protecting credit card transactions over digital packet-switched networks was defined by a working group of cryptologists beginning in the 1980s and working under the direction of the American National Standards Institute (ANSI) Accredited Standards Committee (ASC) X9 for Financial Industry Global Standards. See ANSI, X9.24-1:2009 Retail Financial Services Symmetric Key Management Part 1: Using Symmetric Key Techniques, 2009. Devices are designed to meet the requirement of individually encrypted transactions that are separate from all other transactions and which protect keys at all times. The solution they describe is called "Derived Unique Key Per Transaction". This standard, called DUKPT (pronounced "duck-putt"), describes several aspects of the security solution and encompasses several U.S. patents. See Abraham et al. (U.S. Pat. No. 5,745,576), Hopkins (U.S. Pat. No. 5,999,624), and LaBounty (U.S. Pat. No. 4,984,270). DUKPT is not an encryption scheme, but rather a key generation and management scheme.

DUKPT consists of several important steps that meet specific requirements. The first is that key generation is performed in protected hardware modules and keys are never transmitted out of the hardware. Second, once the initial key is injected into the hardware, it is used to derive an array of future keys, and is then discarded. All subsequent key material is derived from an initial key in a formulaic way. This allows an encrypting device to be in sync with a decrypting device so that keys never need to be shared, copied, or transmitted. Rather, a key serial number is used to convey which key belongs to which encrypted transaction. The key is used by the "originator" to encrypt data and is then discarded. The encrypted data is sent to the "receiver" which, based on the serial number, can re-derive the same key to be used for decryption.

Using the DUKPT scheme, every transaction can use a key which is distinct from all other keys, except by coincidence referred to as a "collision". This is done through the use of unique identifiers and counters which increment for each transaction. If a single key is compromised or exposed, all previous and future keys remain protected. They are only related through the common derivation methods from the initial master key, known as the Base Derivation Key (BDK). There is no need for an interactive key agreement so long as the encryption and decryption devices are initially synced, for the life of the devices.

FIG. 1 illustrates a known DUKPT key derivation process 10. The X9.24 standard describes the process for both the "originator" (the device which performs encryption) and the "receiver" (the device which performs decryption). The steps for the originator are:
 1. The Base Derivation Key is used to create an Initial PIN Encrypting Key (IPEK) as seen at box 12. The IPEK is loaded into the device.
 2. The device uses the IPEK to generate (irreversibly) a set of initial "future keys" as seen at box 14, and the IPEK is then discarded.
 3. A transaction is initiated as seen at box 16, and the device calls one of the "future keys" seen at box 18 to encrypt the message.
 4. A Key Serial Number (KSN) is defined as an identifier for the transaction as seen at box 20. The KSN is determined from a unique identifier for the device and a transaction counter.
 5. The device forwards the encrypted transaction message and the KSN to the receiver.

6. The device increments the transaction counter, destroys the key used, and generates a new key.

The receiving system follows a similar set of steps:
1. Using the BDK, the IPEK is generated.
2. Using the KSN from the originator, the appropriate session key is regenerated.
3. The message is decrypted using this derived key.

Hardware, Software, and Firmware

A further consideration is whether a solution for encrypting network recordings should be made in hardware or software. There are a number of reasons that the present invention should be implemented on firmware for a dedicated network interface card.

First, there is a significant speed difference if using dedicated hardware to process the data. Relying on the Operating System to handle network packets requires copying bits from the hardware to main memory and employing a software library or driver to copy the data to user space, process it, combine calls to other software modules and libraries, and then write it to disk. If the processing necessary for flow identification, encryption processing, and key management is done in hardware, and then an appropriately defined element can copy the processed (encrypted) packets to the OS for storage to disk, a number of copying steps can be eliminated. The goal must be to process large numbers of packets and separate flows with encryption taking place prior to writing to the OS. This can best be accomplished with dedicated chips on a single board designed to serve just this purpose.

The primary reason for a hardware solution, however, is the inclusion of a physical tamper resistant implementation to protect key material and enhance the security provided by the solution. By keeping key material entirely within a hardware component, there is no need to copy key material to the OS or to another device, which greatly reduces the risk of exposure of the keys. By making the hardware tamper resistant, it is possible to reduce the risk of key extraction from the module even further.

TRSM: Tamper-Resistance in Hardware

Tamper-resistant security modules (TRSMs) are specially designed hardware often used for dedicated encryption devices in high security environments. See McLoone, M. and McCanny, J. V., "System-on-chip architectures and implementations for private-key data encryption", 2003, Springer; Parelkar, M. M., "Authenticated encryption in hardware", 2005, George Mason University; and Vahedi, H., et al., "Power-smart system-on-chip architecture for embedded cryptosystems", Hardware/Software Codesign and System Synthesis, 2005, CODES+ ISSS'05, Third IEEE/ACM/IFIP International Conference, 2005, IEEE. The hardware consists of both physical protections and logical protections, which make successful tampering or extraction of key material difficult and improbable (though likely never impossible). That is, if the hardware logic becomes aware of an attempt to copy material from the device or to modify data in the memory of the device, key material is destroyed and counters or security parameters are reset or "zeroed." More importantly, if key material is stolen from one device, an attempt to inject it into another similar device for decryption of captured data will result in it being irreversibly altered and thus rendered useless.

The ANSI X9.24 standard provides some guidance and outlines specific requirements for the construction of physical barriers (e.g., tamper-evident coatings) and logical controls (e.g., tamper-responsive circuitry) (see ANSI, ibid.) when creating a TRSM for use with key management and encryption functions. The requirements for the module include the following:

- The TRSM includes means that detect attempted tampering and thereupon cause the automatic erasure of all cleartext keying material contained in the device. Tamper detection shall be active regardless of the power state of the TRSM.
- The TRSM is constructed with physical barriers that make successful tampering infeasible.
- The TRSM is sufficiently resistant to tampering that successful tampering requires an extended time, such that the absence of the TRSM from its authorized location, or its subsequent return to this location, has a high probability of being detected before the device is (again) used for cryptographic operations.
- The TRSM is constructed in such a way that successful tampering will cause visible damage to the device that has a high probability of being noted after the device has been returned to its authorized location but before it is (again) used for cryptographic operations. However, when a TRSM employs this feature exclusively, it shall be used only in conjunction with unique key per transaction key management.

Encryption Versus Decryption Processes and Hardware Requirements

In order to properly handle network recording and analysis on large enterprise networks, it is necessary to copy and transmit the recorded data from the site of encryption to the site of analysis. To provide the best security for these network recordings, it is necessary to provide a solution with a means of encrypting the network data immediately upon recording, allowing decryption as necessary for analysis. In one embodiment of the present invention, two separate but similar hardware devices are required for performing these actions. The originating (encrypting) device is designed to be located in a relatively unsecured location such as a retail store front. In the case of network monitoring, the TRSM responsible for handling encryption of data should be located with the network interface card, or cards, used to tap a network, such as at an organization's boundary or core routers, most likely in some sort of data center. This can be thought of as unsecured for the purpose of protecting these sensitive recordings from prying eyes that may otherwise have access to the data center (e.g., system administrators, support personnel, vendors performing maintenance, outside law enforcement personnel, etc.). By employing a TRSM to handle the encryption, data are protected, and any subsequent copying or network transfer is safe, as the keys are unique and never transferred with the data.

The receiving (decrypting) device is then located at a remote location, such as a payment processor in the case of financial transaction systems, or a network security analyst's work space. The receiving devices must perform relatively similar operations with the data. It is at the receiving end that the focus must switch from tampering and key exposure to thorough authentication, authorization, and accounting services which identify every user and every action taken to decrypt the secured messages.

In the retail transaction model, the receiver is designed to be a payment processor that receives encrypted transaction messages from many different encrypting devices. This model is useful to understand the difference in requirements for the decryption devices. The decryption devices must have a copy of the master key used to create the initial keys (IPEKs) and subsequently derive transaction keys based on the KSN received with the encrypted data. The protection of the BDK and IPEKs must themselves be protected with other means, but the standard falls short of specifying requirements here, as the model in use is such that the payment processor can be trusted.

Key Injection, Secret Sharing and Split Keys

The most significant control point providing protection for network traffic recordings is in the control and audit of all derivations of decryption keys. The single master key which produces the seed for all subsequently derived keys may be considered the most valuable single piece of data in the organization, since it can be used to produce the keys that will decrypt any network. There is greater risk in concentrating all of this potential in one place. On the other hand, this key becomes the one thing that needs serious security considerations, and all else is then much more protected. There are several methods in modern cryptography designed to protect such a high-value item.

An initial approach involves splitting this key into smaller byte groups that can then be stored separately by separate analysts. This is an ostensibly straight-forward approach, but in practice it presents many challenges. Bits (of a key or of any data) are never really moved around, they are copied. They remain in memory or as remnants on the disks from which they were moved. At any point between their original location and their new location, they may be surreptitiously copied as well. Once two parts of the key are brought together to be used, a user of that system may retain the copies of the key in the future.

Split keys can be protected through a scheme of secret sharing. See Blakley, G. R., "Safeguarding cryptographic keys", Proc. AFIPS 1979, National Computer Conference, 1979 and Shamir, A., "How to share a secret", Communications of the ACM, 1979, 22(11): p. 612-613. A secret sharing scheme allows a secret (e.g., an encryption key) to be divided into portions called shares, such that a threshold of participants (which can be less than the total number) are necessary to recover the secret. By splitting the key and utilizing a secret sharing scheme, some protection from fraud and collusion can be provided. A critical control element in the DUKPT TRSM mechanism is the manner in which key material is initialized or "injected" into the TRSM. By design, the hardware module makes an irreversible logical change to the initializing key, such that any future recovery of the key used to encrypt data will not actually produce a key that can be used on another device. That is, the act of initializing a key into the TRSM produces a new key for operations. This key cannot be reversed to recover an initializing key. If the originating (encrypting) TRSM and receiving (decrypting) TRSM are initialized at the same time, the key injected into them can be destroyed forever and no other device can be initialized in the same way. By adding a secret sharing scheme to this initial master key, a "backup" copy can be preserved for initializing a device again in the future, and it may require multiple parties to bring their shares together in order to recover the key.

SUMMARY OF THE INVENTION

As the complexity of our most critical networks and the threats against them continue to grow, so too does the need for extracting actionable information from the streams of data available to analysts from the network. One of an analyst's most powerful and important capabilities is reviewing captured and recorded data streams in depth. Another is being able to share data and collaborate with other analysts or external investigators. The need to do so drives the design of a software library and collection of tools which standardizes the recorded format of network data streams, promoting portability and widespread adoption. The present invention provides a solution to the problem of assuring confidentiality and integrity of network traffic recordings. By providing an encryption capability to ensure authorization at the data level (by individual network flow), this design will promote collaborative investigations and information sharing through proper authorization and accountability.

The system and method for the present invention integrates three specific technologies—PcapNG, IPFIX, and DUKPT—implementable in secure hardware to encrypt network recordings as they are written to disk, with a unique key assigned to each unique network traffic flow. Each data encryption key is derived from a master key. Access to these keys can then be controlled through various mechanisms, and the exposure of a single key does not pose a threat to other keys in use. Access to specific communication flows can be isolated and audited, preserving privacy where appropriate, and providing assurance of integrity of the network recordings.

The present invention is directed to a system, method and apparatus for computer security monitoring, information sharing and collective intelligence between and among computers connected together by a network. One embodiment of the present invention includes a network interface device with hardware-based logic for recognizing and cataloging individual sessions. The network interface device is in communication with the network and includes:

a. cryptographic key management hardware components with symmetric key algorithms;

b. a packet encryption module using derived keys to encrypt network packets; and c. a system for storing encrypted copies of network packets as blocks.

Third party analyst hardware and software is capable of deriving keys necessary to retrieve encrypted network packets.

BRIEF DESCRIPTION OF THE DRAWINGS

FIG. 3 is a chart of hash algorithms and codes purposed as a part of the present invention;

FIG. 4 illustrates an example of an Enhanced Packet Block with Hash Option;

FIG. 5 illustrates a PcapNG example EPB with Flow Identifier Option;

FIG. 6 is an example of a PcapNG flow block;

FIG. 7 is a table of flow types;

FIG. 8 is a PCAP Flow Block with statistics as options;

FIG. 9 illustrates an example of a PcapNG Encrypted Block;

DETAILED DESCRIPTION OF THE PREFERRED EMBODIMENTS

Figure 1:
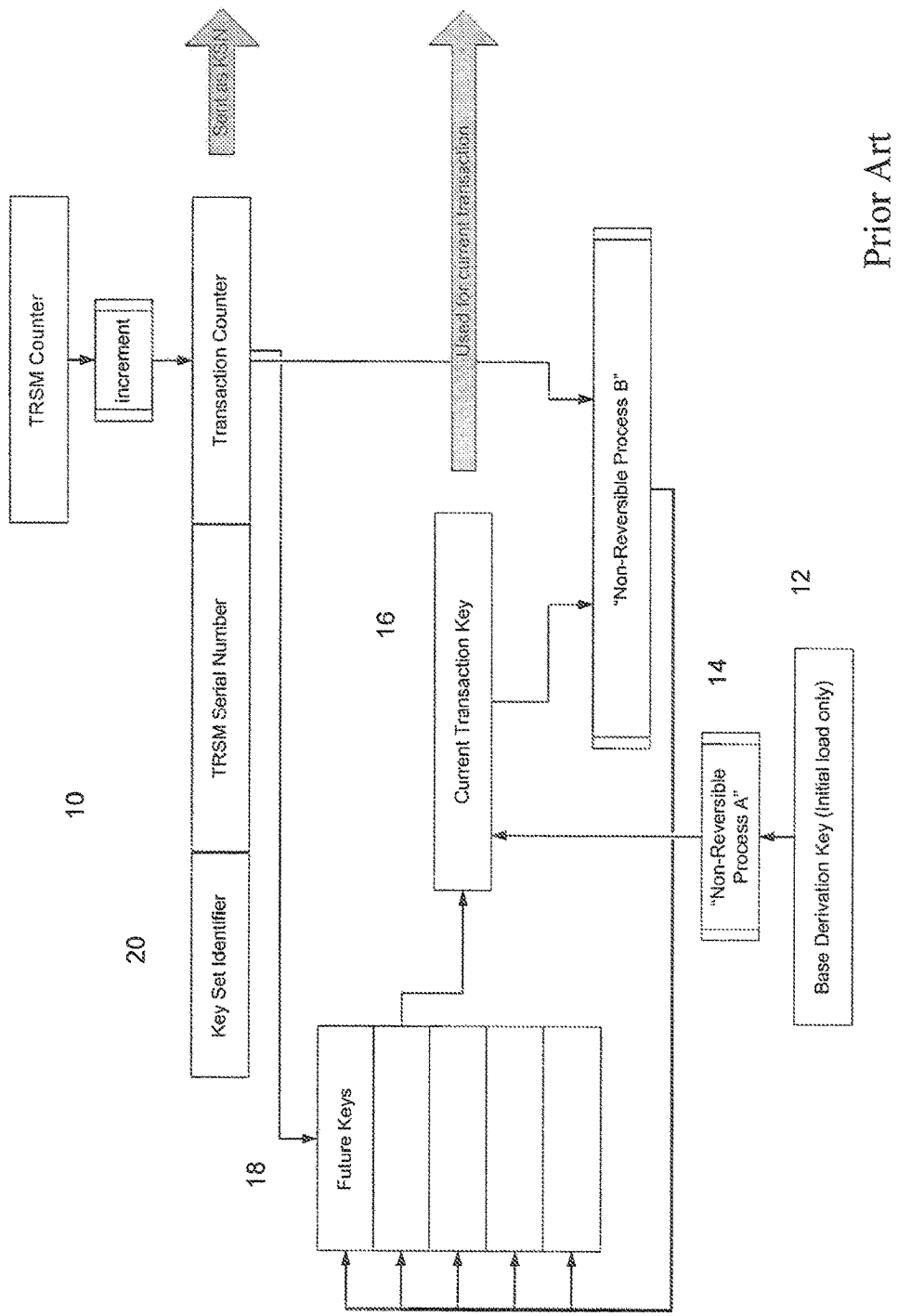
FIG. 1 illustrates a known prior art key derivation process.

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

The present invention employs a network monitoring or "sniffing" device or apparatus that will identify and separate communication streams called network flows and subsequently encrypt the packets of these flows separately using a key management scheme similar to DUKPT. A method for flow identification and encryption uses a purpose-built hardware component capable of identifying network packets by their flow and encrypting them with the appropriate corresponding key in line. By communicating these encrypted packets to the operating system via a modified libpcap.so library, the OS will be able to pass these packets along using the modified PcapNG format.

An analyst at the receiving end will be able to use various parallel tools that generate alerts based on the network traffic to identify suspicious network flows. Using the flow identifier, an analyst can look up the flow identifier and the corresponding Key Serial Number, then regenerate the correct key using a synchronized DUKPT device, retrieve the correct packets from the network recording, and decrypt the packets into a PcapNG format with plaintext packet blocks. These plaintext blocks can be analyzed with various compatible network security monitoring tools (e.g., to strip embedded file transfers from packet payloads). The key checkout/derivation process will require strong authentication and provide auditing capabilities to guarantee accountability and non-repudiation. The hashing, encryption, and storage process will provide data integrity for forensically sound evidence preservation. The scheme will support greater privacy assurance and promote better information sharing with outside parties, such as law enforcement, greatly reducing the chances of accidental or malicious abuse of a network monitoring system.

One embodiment of the present invention is as part of a large datacenter-installed system with large volumes for storage. The present invention would support System Components Network Interface with Flow-Processing Logic There are five critical components to this system. The first is a network interface card (NIC) which includes hardware-based logic for recognizing and cataloguing individual network sessions or "flows". There have been efforts to construct such devices, largely in the realm of network appliances such as load balancers. See Fedyukin, Corl Jr., Kohn, and Li, ibid. Some efforts have been made to perform these classifications for security purposes. See Gennuso, Lam, and Nanda, ibid. The present invention extends a growing body of work on flow classification and analysis, while pursuing a novel hardware implementation.

Hardware-Based Cryptographic Key Management

The second critical component is a cryptographic key management (CKM) component. This will be implemented as a TRSM or HSM component on the same circuit board as the NIC. Some research has been done regarding the security and proper design requirements of hardware-based encryption and key management. See McLoone, Parelkar, and Vahedi, ibid., and Dwoskin, J. S. and Lee, R. B., "Hardware-rooted trust for secure key management and transient trust", Proceedings of the 14th ACM conference on Computer and communications security, 2007, ACM; Feldhofer, M., Wolkerstorfer, J., and Rijmen, V., "AES implementation on a grain of sand", IEEE Proceedings-Information Security, 2005, 152(1): p. 13-20; Hodjat, A. and Verbauwhede, I., "A 21.54 Gbits/s fully pipelined AES processor on FPGA", Field-Programmable Custom Computing Machines, 2004, FCCM, 12th Annual IEEE Symposium, IEEE; Järvinen, K., Tommiska, M., and Skyttä, J., "Comparative survey of high-performance cryptographic algorithm implementations on FPGAs", IEE Proceedings-Information Security, 2005, 152 (1): p. 3-12; Kuo, H. and Verbauwhede, I., "Architectural optimization for a 1.82 Gbits/sec VLSI implementation of the AES Rijndael algorithm", Cryptographic Hardware and Embedded Systems—CHES 2001, Springer; Pramstaller, N., et al., "Efficient AES implementations on ASICs and FPGAs", Advanced Encryption Standard—AES, 2005, Springer, p. 98-112; and Sklavos, N. and Koufopavlou, O., "Implementation of the SHA-2 hash family standard using FPGAs", The Journal of Supercomputing, 2005, 31(3): p. 227-248. The present invention employs DUKPT, with some necessary modifications. This approach largely meets the requirements for securing multiple and separate streams of data and having independent "forward-secure" encryption keys. The present invention covers in depth the security requirements for these devices and for their management.

There are several important aspects of the key management scheme defined for financial transactions of credit card swipe machines that must be addressed and modified for network traffic recordings. The most obvious is that the hardware used to perform these actions must be modified to work on a network interface card (NIC). The X9.24 standard, developed in the late 1980s and 1990s, relies on the use of Triple-DES encryption. A more appropriate updated solution would be adapted to use stronger and widely accepted symmetric key algorithms, such as AES. See FIPS PUB 197: Advanced encryption standard (AES), 2001; Daemen, J. and Rijmen, V., "AES proposal: Rijndael", First Advanced Encryption Standard (AES) Conference, 1998; and Daemen, J. and Rijmen, V., "The design of Rijndael: AES-the advanced encryption standard", 2002, Springer. This will result in the need to work with 128-bit keys (at a minimum) rather than multiple 56-bit keys. Another important and closely related problem is the need to handle an appropriately sized transaction counter. Because the counter is related to the key size, solving one should solve the other problem as well. In the X9.24 standard, a counter of 21 bits is used. This means that after roughly 2 million transactions, the device (typically a card-swipe PIN entry device) is expired and must be reloaded. On a moderately busy network, 2 million network flows may be reached relatively quickly, perhaps even in minutes or seconds.

Another major deviation from the X9.24 standard which is addressed is the need to hold on to transaction keys temporarily, and not immediately discard them. When encrypting network flows on packet-switched networks, multiple separate packets will be part of the same flow and should use the same encryption key. Hence, keys must be stored and reused for the life of the network flow. This may create additional need for memory management of large lookup tables.

Routers and stateful packet filters currently process flows for large enterprise networks with some thought given to this problem. Generally, the routers work by calculating some look-up hash and storing them in hash tables. Keys can be stored in the same way as flow identifiers. A typical router flow hash table can be modified to store both a hash and an assigned key serial number.

As flows expire, either through an end of communication (e.g., a FIN sequence or RST) or by passing some timeout threshold, so will keys. It is possible that separate portions of the same communication stream may be identified as distinct flows and have separate keys. This is addressed in the flow lookup and key derivation process, so that all portions of related flows are queried together and all keys are recovered together. The problem is no different than current flow analysis challenges.

Onboard Packet Encrypting Logic

The third component is the encryption module which uses derived keys to encrypt network packets. This component is likely to be implemented along with the CKM, as is typically the case for financial transaction systems. The combined hardware will securely store injected master key material, derive subsequent keys, and perform the encryption of packets based on a flow ID determined by the NIC. The combination of an encryption device on a network interface card has not been done previously. This combination is a key feature of the present invention.

Necessary Components for Handling Encrypted Packets as Blocks of Data

The fourth component of the network encryption process is the hardware, software (e.g., OS driver and libraries), and process for storing encrypted copies of network packets as blocks in the enhanced PcapNG file format. This includes necessary hardware and software to properly interpret the encrypted packets as they arrive from the NIC to an Operating System so that they can be written to disk or other long-term storage.

Decryption and Analysis Components

The fifth component of this system is physically separated from the previous four, which are part of the recording apparatus. It is the corresponding analyst's hardware, software, and processes for deriving the keys necessary to retrieve encrypted network packets. For the most part, this will be mirrored hardware, software, and processes from the encryption processes and so will consist of the same constituent parts with one critical difference. The security provided by the decryption components will come in the form of the associated authentication, authorization, and accounting services used to share access to the critical master key and access to the hardware that re-derives individual decryption keys. A major intention of this invention is to provide assurance that only personnel with the proper authority can gain access to network traffic recordings (specifically payloads). As a corollary, the integrity of the data accessed will be assured through verification of the packet hashes. This cannot be achieved without proper procedures and tight control over the use of the decryption keys.

System Design

The design presented herein consists of three specific technologies—network flows, PcapNG, and DUKPT—implementable in secure hardware to encrypt network recordings as they are written to disk. This is done with a unique key assigned to each network traffic flow. Each data encryption key is derived from a master key. Access to these keys can then be controlled through various mechanisms, and the exposure of a single key does not pose a threat to other keys in use. Access to specific communication flows can be isolated and audited by logging access to these individual keys. As a result, privacy is preserved where appropriate, and policies can be enforced. As an additional benefit, assurance of integrity of the network recordings is also provided.

The system designed consists of several components working together to provide a secure approach to network recordings. The system includes a network interface card capable of tapping a network and the following additional hardware-based components:

1. logic for recognizing and cataloging individual network sessions or flows;
2. cryptographic key management components for deriving, handling, protecting, and destroying cryptographic keys; and
3. packet encryption and hashing modules that use the derived keys.

Figure 2:
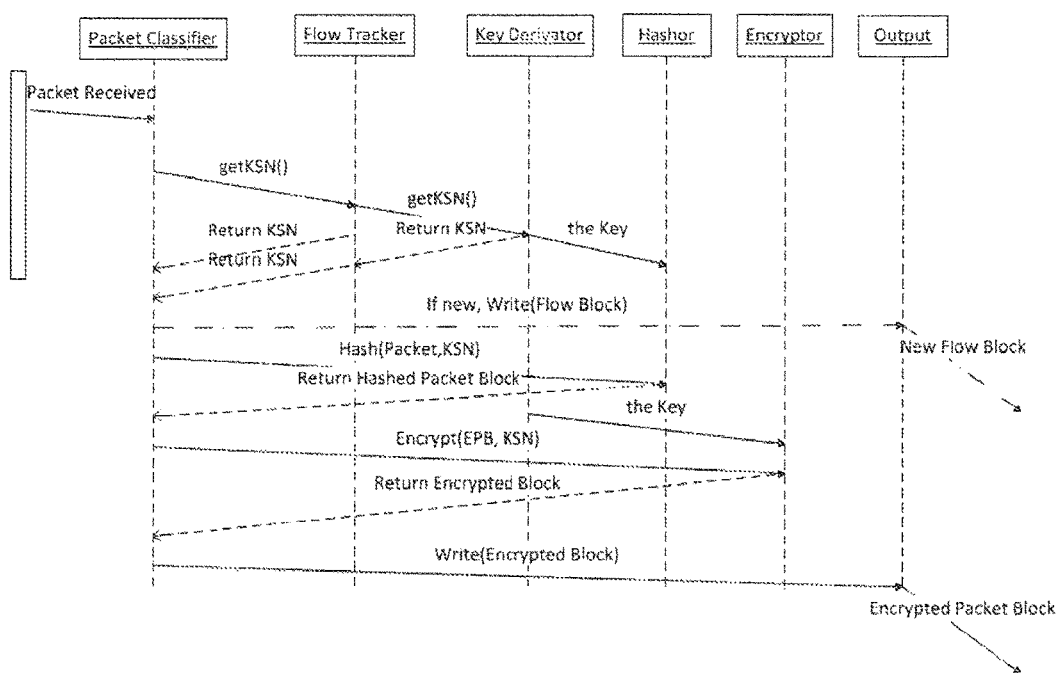
FIG. 2 illustrates a sequence diagram of the present invention.

FIG. 2 depicts the sequence diagram that models the interaction of these components. Once a packet is received by the packet classifier, its flow is identified and a Key Serial Number (KSN) is requested. This KSN is either cached already, or a new one is generated by the DUKPT mechanism referred to in the figure as the "Key Derivator." Using the KSN, and the packet handler can request a hash be generated and the packet block encrypted. The encrypted block can then be passed for output, generally to be saved in a file.

A vital but separate component of the design presented here is the software and hardware for storing, reading, and processing encrypted copies of network packets as PcapNG data blocks. Whereas the secured hardware deployment of components is designed for capturing and securely storing network recordings, the receiver of these encrypted data blocks may consist of an analyst's workstation with visualization tools and a back-end data storage array or digital evidence locker. The important component for the receiver should include the key management, encryption (decryption) and hashing functions in protected, tamper-resistant hardware. This may exist in a number of form factors, but this does not affect the controls built into the design presented here.

Modifications to DUKPT

The DUKPT Algorithm

In the system presented here, specific adjustments to the DUKPT algorithm and flow of information were made to accommodate network monitoring requirements. All procedures as described previously remain unaltered except for the necessary changes to replace DES and 3DES algorithms with AES, as well as Twofish as an alternative. For the procedures called by DUKPT, calls to "DEA" were replaced with AES-128 and any calls to "TDEA" (commonly referred to as 3DES-ede which performs three DES operations with two keys or one "double-length" key split in two parts) was replaced with AES-256. The practice of three calls to AES-128 did not carry forward. Rather, one call to AES-256 with a "double-length" key suffices for better security as well as much higher speed of execution. The changes made to the encryption counter (EC) size, the shift register (SR) size, and the number of slots in the Future Keys Register (FKR) affect the number of rounds of the DUKPT algorithm that get executed, but does not affect the flow of the algorithm or procedural steps that are necessary. Thus, any cryptographic strengths and characteristics of the modified DUKPT should still hold given that AES or other block ciphers exhibit the same cryptographic properties as DES.

Departure from the ANSI Standard

One challenge with the use of DUKPT in the network context is that it is not designed for packetized transactions. With credit card swipes, DUKPT uses a key only once, encrypts the transaction, and discards the key from memory. However, with network flows, it is necessary to be able to handle multiple (perhaps thousands) of packets as part of a single network flow. It would be most appropriate to use a single key for the entire flow. The challenge comes in anticipating how many flows may be simultaneously observed and multiplexed past a single network observation point. On large enterprise networks, for which this solution is intended, there may be thousands of simultaneous flows observed by the device. Therefore a much higher number of possible keys from a DUKPT device are needed.

A second major departure from the specification is the reuse of keys. DUKPT is specifically designed to securely discard a key after it has been used. This is done as a feature of the hardware basis for the algorithm. Keys are in memory registers that are being continuously overwritten by new data as the algorithm advances. A key is used once, and it is not transmitted or stored off of the device.

However, in the case of packet-switched networks (i.e. the vast majority of computer networks today) packets do not necessarily arrive in order and may be interspersed with dozens or millions of other data flows. Some flows have very few packets very spread out over a window of time, while others have bursts of packets and are complete after very short times. As long as flows are active, the encryption keys must remain resident in memory. The design presented here makes that possible by housing the network processing hardware and the key generation and encryption hardware within the same tamper-resistant security boundary. Keys can be safely reused in this way, as they still will never be transmitted or stored off of the device on which they are in use.

This creates a potential problem with memory management. Routers and stateful packet filters currently process flows for large enterprise networks with some thought given to this problem. Generally, the routers work by calculating some look-up hash and storing session states in hash tables. Keys can be stored in the same way as flow identifiers. A typical router flow hash table can be modified to store both a hash and an assigned key serial number. As flows expire, either through an end of communication (e.g., a FIN sequence or RST for TCP communication) or by passing some timeout threshold, so flow information and keys will need to be cleared from memory. It is possible that separate portions of the same communication stream may be identified as distinct flows have separate keys. This should be addressed in the flow lookup and key derivation process, so that all portions of related flows are queried together and all keys are recovered together. The problem is no different than current flow analysis challenges. Continued research regarding this issue will be required to determine the appropriate memory requirements to make this solution effective on large-scale enterprise networks.

Finally, the ANSI standard is written for a specific purpose: the protection of credit card data when transmitting the data from a point of sale device to the payment processor. Several of the functions and procedures defined in the specification only make sense in the context of these types of devices and transactions. PIN entry, for example, is not a necessary function for this network monitoring system design. However, in the "PIN Entry" function of the specification, the steps to produce the actual encryption key are called. Another example is in the referral to the "Initial PIN Encryption Key" or "IPEK." This is referred to as the Initial Key (IK) in the present design. Activating and deactivating the keypad are also functions associated with credit card transaction devices, and are not implemented in the network monitoring system presented here.

Replacing Cryptographic Algorithms

One of features of the DUKPT specification in ANSI standard X9.24 is its use of the Triple Data Encryption Algorithm (TDEA), which is more commonly referred to as 3DES. This is no longer an acceptable standard for strong encryption requirements due to the relatively short key length involved. The modified implementation of DUKPT presented here takes advantage of the more current block ciphers AES or Twofish. The design allows the choice of algorithms to be modular, so that any symmetric key cryptographic algorithm could be used, although perhaps with a greater number of modifications. For this design, an ideal substitute block cipher is one that can operate in both "single-length" and "double-length" keys. For both AES and Twofish, this means using 128-bit and 256-bit keys.

The current DUKPT scheme has a critical reliance on 3DES due to the key length and the way in which the Key Serial Numbers are designated. The benefit of increasing the key length, and subsequently the available counter, is that far more packets can be handled. DUKPT was designed with financial transactions in mind, and there is a physical limit to how many credit cards can be swiped in a given day, and hence the counter size is sufficient. With network traffic, the 21-bit counter with the current design of DUKPT will be quickly exhausted. A change to AES and its larger key sizes alleviates this problem.

Finally, there are many constants and memory register sizes that are sized either 64 or 128 bits to hold "single-length" and "double-length" keys. For each of these elements, the present design generally doubles their size to the new "single-length" of 128 bits and "double-length" to 256 bits. For the constants used to XOR in variations of derived keys, these are concatenated to themselves to double their length.

There are other considerations when migrating algorithms from using 3DES to AES. Just as they have on so many other cryptology topics, NIST offers guidance on making these transitions.

Extending the Algorithm Rounds and Total Key Count

One of the security features of the DUKPT design for credit card transactions is that it is meant to be limited in the number of keys that it can produce. If these keys generated are reasonably random, they will appear dispersed throughout the possible key space (e.g. between 0 and $2^{64}$ in the case of single-length DES keys.) DUKPT's designers envisioned producing a million possible keys, roughly $2^{20}$, which requires 20 bits in the Encryption Counter. By making the Encryption Counter 21 bits and then only using those serial numbers which have 10 or fewer bits set to "1," DUKPT uses half of the serial numbers between 0 and $2^{21}$. The number of bits set to "1" determines the number of rounds in the key derivation operation. Hence, the same number of keys can be produced, but the rounds of operations are limited to 10 rather than 20.

This design offers plenty of credit card swipes before the base derivation key needs to be refreshed. It provides too few opportunities for collisions or repeated keys as only $2^20$ keys out of a possible $2^{128}$ keys are selected.

However in packet capture of a modern high-speed Ethernet-based network, 1 million different flows may pass a sensor point within a second, or certainly within a few days, much quicker than humans making purchases at a single point-of-sale counter in a single store. Because of the need for more keys, the counter needs to have more bits available. Instead of using a 128-bit key space for 3DES, it is reasonable to use 256-bit key space with a current block cipher like AES or Twofish. Likewise, instead of using 21 bits for the counter, the design presented here provides a very large number of possible keys that is still a very small percentage of the available key space. By increasing the range from $2^{21}$ to $2^{63}$, this version of DUKPT can provide over 4 quintillion possible keys (still a small sample of the $2^{256}$ key space). As with the original design, by choosing half of these serial numbers, the number of rounds of operations can be limited as well. This is done by limiting the number of "1" bits in a valid counter to less than half Instead of 10 "1"-bits or fewer for a valid serial number, this design uses 31 or fewer.

An odd number power is chosen for this reason. If the designers had chosen $2^{20}$, then less than half would have 0-9 one bits, and an equal number would have 11-20 one bits, and 10 would have some portion in the middle. With an odd number, like $2^{63}$, there are an equal number of numbers between 0 and $2^{63}$ that have 31 or fewer bits set to "1" as there are those that have 32 or more bits set to "1."

The new modified DUKPT can generate 256-bit AES keys rather than 128-bit TDEA keys, and it can generate $2^{62}$ keys (actually 4,608,408,605,783,752,704—about 4.6 quintillion) before the counter rolls over and it must cease operation. At that time, should it ever be reached, the device can be re-initialized with a new base derivation key.

Direct Derivation Method Versus Sequential

The Annex of X9.24 describes two methods for arriving at a given encryption key. The second method is the beauty of the design of DUKPT. Given a random seed and a typical pseudorandom bit generator, one can create a key stream in which new random keys are created. In fact, this can be done in a way that provides forward secrecy. But it cannot generally be done with direct access to a given key in the stream given the proper starting state. That is, if a key stream algorithm can be initialized to match a counterpart that has been running for a long time, the only way for the other key stream to catch it and make accurate calculations about future keys is to have sequentially derived the entire key stream.

DUKPT is different. Because it uses a counter to derive keys, which guarantees uniqueness of the sequence since every number is unique and well-ordered, any key in the sequence can be instantly accessed. It can simply be re-derived using the starting state of the cryptosystem and the given serial number without requiring the entire intermediate key stream.

The DUKPT standard for credit cards expects there to be an originator and receiver. The originator generates sequential keys and uses each one sequentially with the transactions that come its way. The receiver can then access any one of the transactions given the BDK and the KSN. Ironically, it is highly unlikely that a payment processor would want to process only one or a few transactions. All received transactions can generally expect to be decrypted by the same processor. This over-engineering of the DUKPT standard serves the current network security need much better. As one of the goals is to preserve privacy, it is not likely all encrypted flows will be decrypted. Thus, the direct access to arbitrary keys can be taken advantage of.

The specific modifications to DUKPT for the solution presented here are straightforward. To begin, all registers must be larger. The procedure presented in the X9.24 Annex describes working with the "rightmost" 21 bits of a register that is intended to correspond to the Encryption Counter. Each of these references must be adjusted to work with 63 bits rather than 21. The block cipher used must be modified from DEA to AES or Twofish.

Extensions to PCAPNG Specification

The PcapNG file format offers several distinct advantages to this work through its use of data blocks of various types, as well as its extendibility. The specific design of new block types and extensions to existing block types is presented here.

Enhanced Packet Block Options

Hash Option Further Defined:

This section presents a modification to the Enhanced Packet Block (EPB) type, including an implementation of one of its key options: a packet block hash. This hash value will be critical in protecting and verifying the integrity of the packet after it has been encrypted and decrypted. In the existing implementation of EPB, the hash is unprotected as a plaintext addition to the block. In the designed solution, the hash will be encrypted with the EPB and protected properly. For enhancing the enhanced packet block, two types of hashes are defined: keyed hashes and non-keyed hashes. The specification currently defines two non-keyed hash types: MD-5 and SHA-1.

FIG. 3 provides a list of hash algorithms and codes proposed for the PcapNG standard specification. It includes both the hash algorithm options currently defined in the current PcapNG standard and several new proposed hash algorithms and algorithm options.

In order to calculate the hash of the packet on hardware as the packet arrives, as suggested by the specification, it should be of the packet only, not the metadata added to it. However, this leaves the metadata such as timestamp outside the integrity-protecting envelope of the hash. If the hash includes the enhanced packet block additions of timestamp, packet length, and capture length, these values can be checked for preservation. This data is important to help demonstrate that no aspect of the packet has been tampered with since recording. An accurate packet at the wrong time would be detrimental to analysis. The design presented here includes hashing the entire EPB header and packet, but excluding the options and block length or block type. These fields in the block body should not change from the time of the recording. Options are optional and so may be added or removed from a packet, such as a comment added by an investigator.

See FIG. 4 for a PcapNG Enhanced Packet Block with Hash Option.

While the current specification calls for the first byte to designate the digest type and the length to be variable based on the determination of the algorithm, data will still need to align with a 32-bit boundary. Almost all digest algorithms currently considered appropriate have block sizes and outputs that are multiples of 32 bits. Hence, by using one byte at the beginning of this option, the system would almost always be forced to pad 3 bytes at the end of the hash. By changing the hash option value to 2 bytes for hash algorithm and 2 bytes for algorithm options, this problem is avoided. Algorithm options are often available to tune or tweak a digest mechanism. For example, a user can choose SHA2 as the digest algorithm and set an option for 256-bit, 384-bit, or 512-bit digests. Furthermore, one can use the higher order byte of the first two bytes to determine if the digest algorithm is keyed or not.

Finally, because the overall design includes a key unique to each flow seen in the network recording, the key associated with this packet could be used to key the message digest as well using a Hashed Message Authentication Code (HMAC) approach. The key used for this operation is a variant key generated by XOR'ing the derived key with a given constant to produce the MAC key.

Flow ID Option:

Another option for the Enhanced Packet Block is a unique flow identifier option. This can be designed in a number of different ways, but the most straightforward is to establish a flow counter in the sniffing software or hardware where flow state is being tracked. As packets are identified as belonging to a specific flow, the flow identifier is added to each Enhanced Packet Block as an option. The primary method presented in this work does not rely on this option to be included as the KSN serves as the Flow Identifier and it is associated with encrypted EPB data. Flow blocks, discussed in the next section, are the way to associate flow metadata with an identifier. If flow processing is used as part of a PcapNG-based network recording effort, but encryption is not used, this option provides an opportunity to gain the same functionality as with the KSN/FlowID number in an Encrypted Block. The option code would be the next available for the current specification of EPB, which is 5. The flow identifier must be a multiple of 32 bits or be padded with 0x00 bytes to the next 32-bit boundary.

See FIG. 5 for a PcapNG example EPB with Flow Identifier Option.

Flow Blocks

Ideally, libpcap can be built to support IPFIX flow information collection, and the PcapNG file standard will be extended to fully support IPFIX-based blocks in the file. IPFIX templates, along with Cisco NetFlow v9, are widely available from a number of devices and there are tools designed specifically to consume this data. The full IPFIX model includes sensors, collectors, and many extensions and specifications. IPFIX data is intended to be passed as the payload of a network packet. It could also easily be stored as block data in the binary PcapNG file format.

However, this is beyond what is necessary for creating an encrypted packet capture using the system presented here. A Flow Block is designed to provide a very simple means to track the initial characteristics of a network flow and record these metadata and addressing elements along with a flow identifier. One of these blocks will be recorded for each newly identified flow. This block type will contain the various elements of the packet used to uniquely identify the flow (e.g. the source and destination IP addresses) and will provide a searchable way to identify the correct encrypted packets in the recording. The Flow ID in this case is identical the KSN used by DUKPT to derive the encryption key. The Flow Blocks will provide the appropriate means of searching for network characteristics (e.g. by IP address) and will provide the flow ID or KSN number, which can then be searched from all Encrypted Blocks in the file as an index.

Block Type:

The block type proposed for the Flow Block is 0xd5555555 or as it appears in binary: 0b11010101010101010101010101010101. This is a number chosen that is above 0x80000000 showing that it is for experimental use. This number is distinctively non-random-looking when examining the binary file, but is an otherwise arbitrary selection.

Flow Type and IPFIX Options:

Flow type identifies what type of flow this block contains. IPFIX Options is a reserved field for future development, intended to allow the full support of IPFIX formatted blocks. This field could contain IPFIX-compatible template options that determine what fields are available in this block, or these fields may all be implemented as block options. The system design presented here relies only on a simple method of determining flow type: summing the protocol numbers (e.g IP version+embedded layer-4 protocol).

See FIG. 7 for a table of flow types.

Flow ID:

The Flow Identifier is a unique number determined in the same way the Key Serial Number is chosen in DUKPT. There is a portion of this identifier that uniquely identifies the monitor station, the organization that is doing the monitoring and the device being used. For example, this could include an organizational identifier concatenated to the Ethernet MAC address of the sniffing interface. The least-significant bits of the identifier should be a unique counter that will be incremented each time a new flow is identified. As mentioned, the DUKPT standard for credit card transaction hardware has a scheme with the most significant 59 bits associated with the specific terminal, and the least significant 21 bits associated with the transaction counter.

While the flow ID could be an arbitrary length, it is first helpful to define it as a multiple of 32 bits. This allows it to be used in multiple ways within the PcapNG file. In the method presented here, it appears as a field in the body of two different block types and as an option in a third. Secondly, it may be a requirement that the flow ID's are globally unique. There should be enough bits to uniquely identify a recording session by device within a given organization and perhaps across all organizations. There should likewise be enough bits to uniquely count each flow that is observed during that recording session or by that device.

In the proposed method, the Flow ID is 20 bytes, and the first two are always 0x01A6 or 0x01A7 to provide the appropriate options for this system. The last 8 bytes are a unique counter, and the middle 10 bytes should contain the 6-byte MAC address of the sniffer, and a 4-byte unique organizational identifier. While 20 bytes may seem like significant additional overhead per packet, this is more efficient than keeping track of all the addressing information used to uniquely identify a flow. The first 12 bytes will remain static. A TCP flow over IPv6 would have 37 or more bytes to track it uniquely: 16 for each IP address and 2 for each port number, plus 1 byte to distinguish if it is UDP, TCP, or SCTP ports or ICMP type and code that was tracked. 8 bytes for a counter is the same space required to keep track of only 2 IPv4 addresses. And as a counter, it is sufficiently large enough to account for the same number of flows as if every unique possible IPv4 address had a conversation with every other unique possible IPv4 address, including itself. This is therefore considered an appropriate length for a flow identifier.

Flow Start and End Times:

One of the most important metadata fields to capture when performing flow analysis is the time at which a flow occurred. The start time can easily be captured. As a packet is identified as belonging to a unique new flow, the time of its arrival marks the start of the flow. Start time is set once when the flow is created. The end time is always updated with every packet added to the flow tally, initially set the same time as the start time. This serves as a "last seen" timestamp which will be accurate if a flow is stopped for other reasons (e.g. timeout, memory release).

Flow Block Options:

There are a number of different ways to track flows and to help flows actively or passively time out to completion. When a flow is initially identified, it should immediately be written to the PcapNG file. Any block that follows it will be associated with the flow ID and should have the proper ID stored in the file ahead of these packets. However, as the flow stats are accumulating and these elements are being tracked in memory, either when the flow ends, times out, or the recording session ends, this accumulated data should also be written to the PcapNG file. In order to take advantage of the extensible design of PcapNG, these statistics are implemented as options to the block, so that both the initial and final flow blocks can be defined by the same block type. Initial and final flow blocks are distinguished by the presence of options for various flow statistics or IPFIX fields.

See FIG. 8 for a PCAP Flow Block with Statistics and Options.

Two metadata elements that are relatively important and relatively easy to track are packet count and byte count. The packet count can exist as a variable of the flow state that is incremented for each new packet identified with that flow. The byte count can be a variable increased by the size of each packet as it is captured. Combined with time, an analyst can later calculate the rates of packets per second, bytes per second, and average bytes per packet, each of which portray important characteristics of that particular network flow.

Encrypted Blocks

FIG. 9 illustrates an example of PcapNG Encrypted Block.

The design presented here extends the current PcapNG format specification by defining the previously proposed Encrypted Block. The following describes the format for the encrypted packet block that consists of a block type number assignment, a short header to specify any necessary DUKPT options and to embed the KSN associated with the packet. The rest of the block consists of the encrypted data of the corresponding Enhanced Packet Block, including the optional hash. Decrypting the encrypted contents of an Encrypted Block should yield a complete Enhanced Packet Block that can be read by tools such as Wireshark without further alteration or additions.

Block Type: Block types for proposed extensions to the PcapNG file format follow a naming convention of being greater than 2,147,483,648 (231) for new proposals or end-user extensions, and less than that for adopted standards. The reason is that this sets the first bit of the block type field to "1." The system presented here assumes a value of 0xAAAAAAAA for the proposed Encrypted Block type. This is represented in binary as 0b10101010101010101010101010101010, a particularly non-random looking sequence. The block total length is calculated as it is for all blocks by adding the four bytes for the type, the four bytes for the length, the four bytes for the length at the end, and the total of all bytes in between.

Encryption Type and DUKPT Options: The first fields of the designed Encrypted Block are the two bytes for "encryption type" and "DUKPT Options." In keeping with the PcapNG block format of designating a "type" to allow for multiple implementations of a particular class of file block, the first byte is used to identify that a DUKPT-based encryption scheme is being used, and the type chosen for this design is 0x01. The second field allows for various options to be chosen for the implementation of DUKPT. The ANSI X9.24-1 standard describing DUKPT also includes a number of other encryption schemes defined, and each is assigned a designator that is to be part of a security management identifier (SMID). The assigned value for DUKPT+3DES is "0xA5." In the design presented here, this byte should be set to "0xA6" for DUKPT+AES or "0xA7" for DUKPT+Twofish.

Flow ID Number as the Key Serial Number: In order to uniquely identify a flow in a network recording, one needs to assign each flow an ID number. In order to work with DUKPT, an encryption counter must be incremented to create a unique Key Serial Number (KSN). This KSN is encoded with enough information for a receiver to identify a Base Derivation Key and be able to use the counter in the KSN to re-derive the appropriate key. In order to associate a key with a particular flow, one needs to map the KSN to the Flow ID. In the design presented here, the Flow ID is the KSN, with one small addition.

The KSN consists of two parts: the encryption counter which makes each serial number unique, and the key set identifier which groups all keys associated with a starting base derivation key. In the original DUKPT specification, the KSI is 59 bits and the counter is 21 making a KSN 80 bits or 10 bytes long. In the new design, the KSN is 18 bytes: 10 bytes for the KSI and 8 bytes (minus one reserved bit) for the counter. For the Flow ID, which must be compatible with PcapNG's requirement to align with 32-bit boundaries, it includes two additional bytes as described earlier: one for "encryption type" and one for future DUKPT options. The total Flow ID is then 20 bytes in length. This allows for roughly 4 quintillion possible unique flow IDs per sensor.

Using DUKPT to Encrypt Network Flows

Initializing DUKPT

Initializing DUKPT with the BDK should be done in a secure facility in compliance with all appropriate requirements for the protection of the clear-text BDK. The key derivation hardware on the tamper-resistant security module must be initialized using the BDK. This process is called injection of the keying material. DUKPT can be used to derive keys both for an originator and a receiver. The intended model of the X9.24 standard is one in which many originators are dispersedly deployed, as point-of-sale PIN entry terminals would be, with a single receiver processing transactions and requiring the secure storage and access to multiple BDKs. The same model can be useful for the intended use of network security monitoring if one pictures a network with many access points for potential sensors, either at gateways between networks or internal to a core or backbone. In some locations it may be necessary to deploy multiple network interface cards bonded together to handle the capacity of large pipes. Thus, a single analyst or team of analysts may have need to access network flows from many sensors.

The Recorder: Each network monitoring sensor deployed to an environment would need to be uniquely identified. This unique identification could include the Ethernet MAC address of the recording device. This number serves as the Key Set Identifier (KSI) for the sensor, and the BDK for a given recording session should be recorded for the Analyzer. The Recorder TRSM, once initialized with the BDK derives the Initial Key (IK) and populates the initial state of the Future Key Register (FKR). The BDK is not retained at the sensor, and the IK is quickly erased after the first key is derived for the first transaction.

The recorder works by remaining initialized and in a state ready to receive network packets, identify the flow they belong to, determine an appropriate key for this packet (from the TRSM), encrypting the packet block (provided by the TRSM), and writing the packet out to disk as quickly as possible. New flows get new KSNs and the counter is incremented until it can produce no more unique KSNs.

The Analyzer: The analyzer components in the proposed model must have two parts designed for segregating job duties. Any in which anyone authorized can review metadata information, identify unique flows, and have them decrypted to analyze further will serve the network analyst. However, access to cryptographic keys that were derived by many different sensors will need to come to one place to decrypt the desired network flows. An appropriate segregation of duties would be for the custodian of the receiving TRSM that can generate keys and decrypt traffic be someone separated from the role of network analyst. It is perhaps most appropriate for administrative control personnel (e.g. HR, IT management) to hold the receiving TRSM and keep it separate from the systems which hold the encrypted recordings and are used by the security analysts. In another scenario, the receiving TRSM used to derive keys could be held by the organization while the encrypted packet captures and some specific flow keys could be shared with external investigators.

In this design, the Analyzer Workstation will identify a network flow (or several associated together) and will request decryption by the Analyzer TRSM. Upon approval, the Analyzer TRSM will decrypt all the packets associated with the requested flows and return the data to the Analyzer Workstation. Alternatively, the Analyzer TRSM will return the proper keys for the packets to be decrypted at the Analyzer Workstation.

Packet Capture and Encryption Process

The process for capturing and encrypting packets is similar to the way in which financial transactions are encrypted, with a few caveats. The step-by-step process at the network monitoring interface is as follows:

1. The network sensor should initialize the recording with the proper file header parameters, such as the network card identifiers, network link layer, and any filters that are being used.
2. As a packet is received by the sniffing network interface card, it is analyzed to determine the unique flow to which it should be associated. The flow analyzer first processes the packet to determine if it is part of an existing or new flow. A Flow ID is determined. If it is a new flow, the TRSM provides the next available number based on the Encryption Counter. If it is part of an existing flow, the KSN for this flow is reused.
3. If this packet identifies a new flow, a Flow Block will be written to the PcapNG output stream. This block will contain the necessary fields for identifying other packets as part of this flow, and will record the KSN as the Flow ID.
4. The packet's timestamp is recorded, along with other requirements of the Enhanced Packet Block. A hashed message authentication code (HMAC) is calculated by the SHA-2 digest component of the TRSM and appended using the Enhanced Packet Block format.
5. Using the encryption key, the AES cipher component in the TRSM encrypts the full EPB with the appropriate key.
6. The KSN and encrypted packet are written in the Encrypted Block format and passed to PcapNG output stream for recording.

Figure 10:
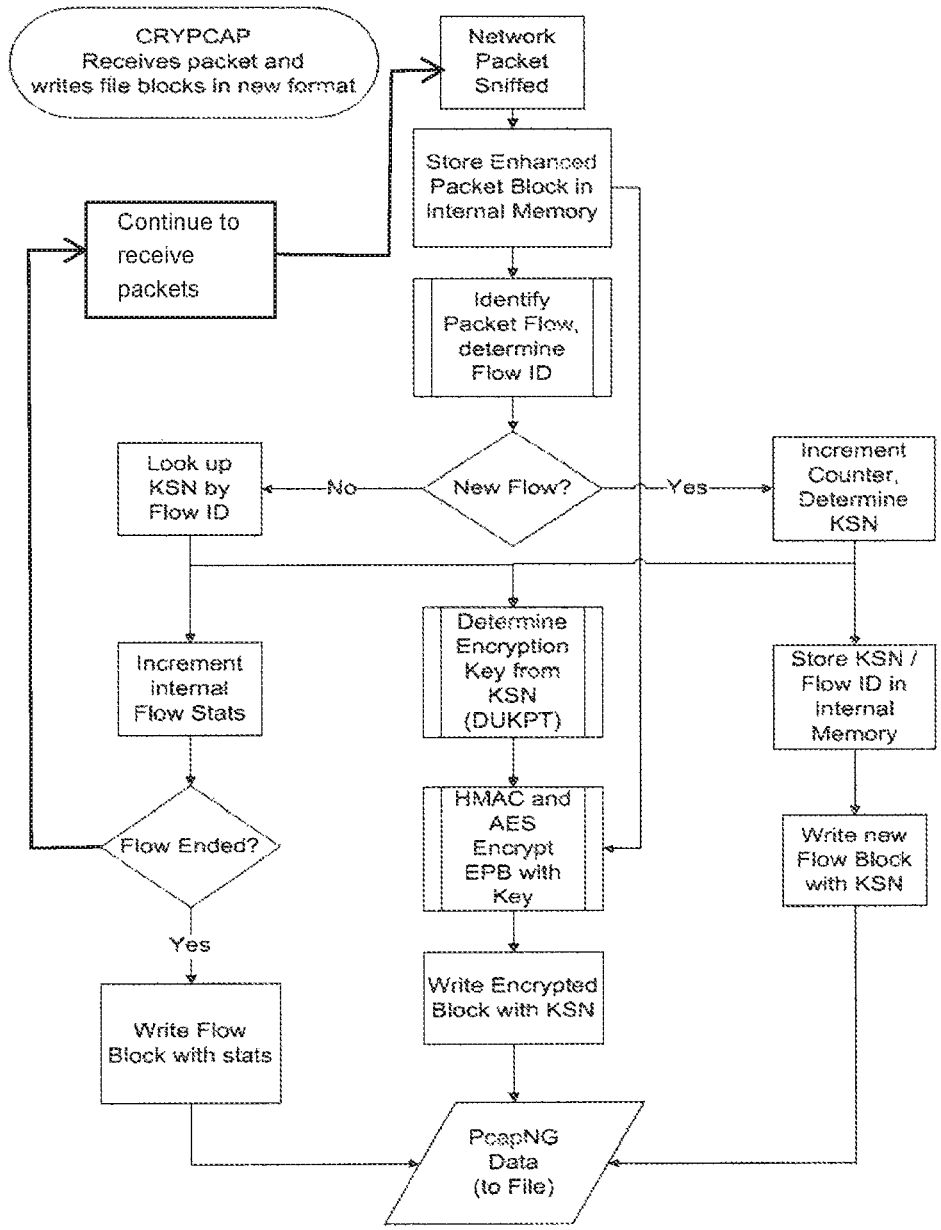
FIG. 10 is a flow diagram of an Encrypted PcapNG recording process.
Figure 11:
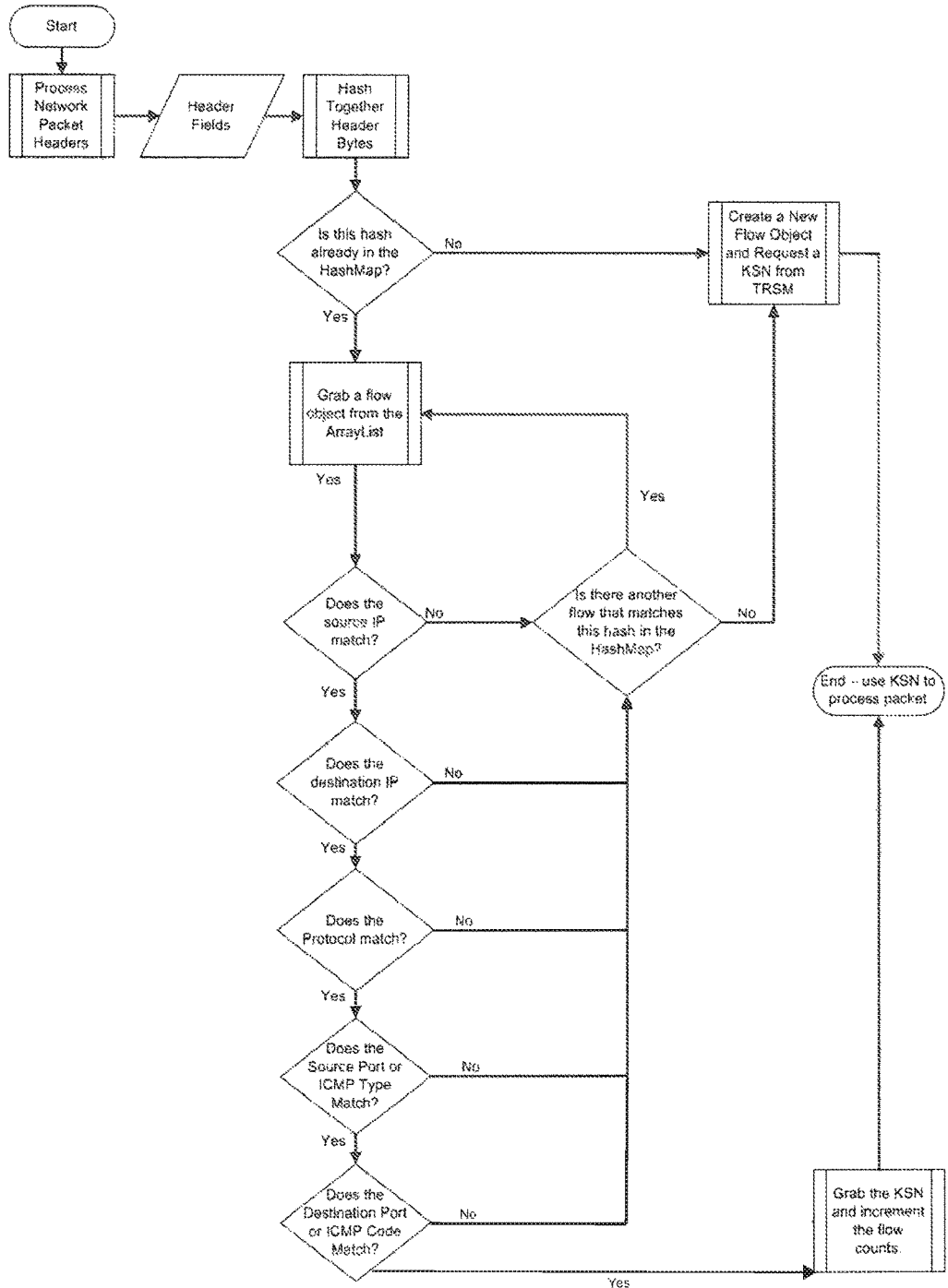
FIG. 11 is a flow diagram of a flow identification process.

FIG. 10 illustrates a flow diagram of an Encrypted PcapNG Recording.

The TRSM component of this design is meant to be on the same circuit board as the network interface that first handles the byte arrays of packets from the wire. The TRSM is the cryptographic system module, but it may be thought of and implemented as three components. The first is the Cryptographic Key Management System (CKMS), which derives the keys using DUKPT. The second is the component that uses derived keys to encrypt network packets. This component is likely to be implemented along with the CKMS, as is typically the case for financial transaction systems that use DES. However, it is also likely to be available as a standalone (and replaceable) AES chip. Such a scenario would allow for the base encryption algorithm to be changed in the hardware, for instance by swapping AES for Twofish functionality. The third component is similarly dedicated to a particular function, which is taking hash message authentication codes, using perhaps SHA-2 or SHA-3, or being swapped for an algorithm like Whirlpool or others in the future. The combined hardware will securely store injected master key material, derive subsequent keys, and perform the encryption of packets based on a flow ID determined by the NIC.

Packet Flow ID Process

In the process described above, the second step discusses identifying a packet with a given flow. This step provides an important opportunity to tune and configure the system design. As discussed, there are many different ways of defining a unique flow. The role of identifying a flow should be performed by a network interface card (NIC), which includes hardware-based logic for recognizing and cataloguing individual network sessions.

Flow Identification Process

In one embodiment of the present invention, each flow is uniquely identified by a combination of layer 3 source and destination addresses, the layer 4 protocol identifier, and the layer 4 socket elements (e.g. port numbers). In other words, every flow is a unique 5-tuple. Flows in this design are uni-directional. This is the most straightforward method to implement (except perhaps IP to IP: a 2-tuple) and without loss of generality exemplifies the solution. Different methods of flow identification could be used and the processes are designed to work as originally intended.

Security Analysis Process

Once everything is encrypted, how can an analyst work with these recordings? What can an analyst do to get access to the payloads he/she needs? It will be necessary to carefully examine the ramifications of imposing an encryption scheme on what are otherwise freely available and highly portable network recordings. One of the secure design principles put forth by Saltzer and Schroeder is "psychological acceptability."

Initially, some network event will be cause for alarm. This may happen purely through examination of network flow information and identifying anomalies. It may also be that an IDS has triggered an alert. This may happen on header information or payload data alike. If it is triggered on payload data, presumably in parallel to this system's encrypted recordings, the alert should notify an analyst of the necessary flow identification details.

Once a particular network flow is determined to be suspicious or worthy of further review, the flow identifier is used to look up a corresponding Key Serial Number (KSN). The KSN will then be used to check out the key from a TRSM dedicated to deriving the keys used for decryption and analysis. Once the key is retrieved, it may be stored with the network data trace file, stored in a local copy of Wireshark or another analysis tool, and used to decrypt only the suspicious network flow. The decrypted packets can then be copied into a plaintext version of the flow in PcapNG format to be ported to other tools.

A typical scenario is for an analyst to be logged in to an analyst workstation that is connected to a TRSM decryption device. He or she will receive some alert or request for a particular network flow that requires an in-depth analysis of its payload (e.g., to examine potential malware or exfiltration of company secrets as a file attachment). The flow can be identified in the same way it was identified upon recording and a KSN can be determined. All packets associated with this flow and KSN are parsed and extracted from the larger recording and set aside. The analyst is then authenticated and authorized to derive the appropriate key and an audit log of the request is generated. Depending on the workflow employed, this request may first be approved by a separate role. The decrypting TRSM is then employed to derive the appropriate session key using the KSN and the BDK and IK. This key is then used to decrypt the encrypted packets and store them in a compatible file format. From there, they can be read into and analyzed by any number of tools capable of deep packet inspection.

From this, it should be clear that the decryption and encryption processes are logically similar, but very different in practice. Decryption keys may be derived in software or as part of a TRSM, given that the likely scenario is not to decrypt all of the recordings, but only those of interest. Once the key is derived and the decryption is performed, normal analysis processes (i.e., any process normally performed today with a variety of PCAP-based tools) will proceed as expected.

The necessary analyst's hardware and software, and the controller's hardware and processes for deriving the keys necessary to retrieve encrypted network packets, must be separated. The focus of the deployment of the decryption components should be on the associated authentication, authorization, and audit services used to grant access to the critical master key (i.e. by controlling access to the key derivation hardware.) The major contribution of this work is to provide a means of assurance that only personnel with the proper authority can gain access to network traffic recordings (specifically payloads). As a corollary, the integrity of the data accessed will be assured through verification of the packet hashes. This cannot be achieved without proper administrative controls.

Information Sharing Process

The solution presented here discusses various aspects of information sharing for security purposes. One of the problems to be addressed with this system is how to protect privacy and other business concerns when faced with a choice of sharing network monitoring information with outside parties such as service providers, incident handlers, and law enforcement. In the past, this decision is generally one of sharing everything through a raw pcap file, or sharing some summary information about what is seen on the network. As a generalization, if an organization needs outside help with understanding what has transpired on their network, they also are likely unable to produce useful summaries that have been properly anonymized or redacted. When sharing a full packet capture, they are inevitably sharing more information than they should. The problem is one of balancing sharing more information with law enforcement and peer organizations, and risking exposure of too much private personal or business information which is not relevant to the investigation at hand.

Using the proposed encryption scheme, PcapNG files could be shared along with a single or small number of decryption keys for suspicious flows to be analyzed without further compromising additional communication streams. This eliminates the "all-or-nothing" dilemma and allows for granular control of information sharing along with the requisite auditing details to review and enforce policy compliance.

PREFERRED EMBODIMENTS

The present invention has been described in relation to the method for recording network traffic in an encrypted format. There are several possible embodiments of this system and method, several of which are described here.

The first preferred embodiment of the present invention is as a large data processing and storage system as would commonly be found in a datacenter. Such a system can operate in conjunction with or as replacement of current intrusion detection and network security monitoring systems. Such systems consist of a rack-mounted computer enclosuring with one or more central processing units, random access memory, multiple hard disk drives, and network interface cards for capturing, processing, and storing network traffic. The embodiment of the present invention is a similar apparatus which contains a TRSM providing cryptographic key management services and the necessary logic to separate individual network flows upon capture.

A second preferred embodiment of the present invention consists of a small mobile unit which can be used (e.g. by law enforcement investigating a suspect's network activity) to connect to small local area networks. This embodiment consists of a much smaller apparatus and is intended to monitor smaller networks over short periods of time. The general method and apparatus of the present invention remains the same.

A third preferred embodiment of the present invention consists of an apparatus with a network interface to mobile telecommunications networks. Such a system may operate similar to the Harris Corporation's "Stingray" system and others currently in use by law enforcement agencies, but with the addition of the present invention's TRSM providing cryptographic key management services, and the necessary logic to separate individual network flows (e.g. phone calls, SMS text messages, etc.).

Whereas, the present invention has been described in relation to the drawings attached hereto, it should be understood that other and further modifications, apart from those shown or suggested herein, may be made within the spirit and scope of this invention.

What is claimed is:

1. A system for network security monitoring, information sharing and collective intelligence between and among at least a first central processing unit and at least a second central processing unit connected together by a network, wherein said system comprises:
   a. a network interface device with hardware-based logic for recognizing and cataloging individual sessions, wherein said network interface device is in communication with said first and said second central processing units and wherein said network interface device includes:
      (i) cryptographic key management hardware components including tamper-resistant security modules with symmetric key algorithms using a 256 bit or larger block cipher, wherein cryptographic keys are derived from an initialization key, which allows said block cipher to be identified and re-computed using a key serial number;
      (ii) a packet encryption module having network packet management components wherein individual packets observed on a packet-switched network are captured, analyzed, encrypted, and stored using said network packet management components to encrypt or decrypt network packets wherein said network packets are captured and stored as Enhanced Packet Block (EPB) types in the packet capture next-generation (PcapNG) file format; and
      (iii) a system for storing encrypted copies of said network packets as encrypted data blocks wherein said encrypted data blocks are stored as Encrypted Block (EB) types in the packet capture next-generation (PcapNG) file format;
   b. a system for analyzing observed network communications individual packets and creating and storing metadata regarding network session information, including use of said key serial number necessary to re-compute the cryptographic key used to encrypt the associated network packet data, wherein said metadata is stored as Flow Block (FB) types in the packet capture next-generation (PcapNG) file format; and c. a third party analyst central processing unit hardware and software for deriving computed encryption keys necessary to decrypt said encrypted network packets.

2. The system for computer security monitoring, information sharing and collective intelligence as set forth in claim 1 wherein said network is the Internet, or a local area network of computers such as a wi-fi or Ethernet LAN, or a telecommunications network of mobile phones.

3. A system as set forth in claim 1 wherein said metadata stored as Flow Block (FB) types includes source and destination IP addresses and time stamp information.

4. A process of network security monitoring, information sharing and collective intelligence between and among at least a first central processing unit and at least a second central processing unit connected together by a network, wherein said process comprises:

a. recognizing and cataloging individual sessions utilizing a network interface device having hardware based logic for recognizing and cataloging individual sessions, wherein said network interface device is in communication with said first and said second central processing units;

b. determining metadata network session information based on each observed network communications packet, including an identifying serial number, and storing said metadata information as Flow Block (FB) types in the packet capture next-generation (PcapNG) file format;

c. managing cryptographic key components including tamper-resistant security modules onboard said network interface device with symmetric key algorithms which use a 256 bit or larger block cipher by deriving cryptographic keys from an initialization key, which allows said block cipher to be identified and re-computed using a key serial number;

d. using at least one computed encryption key which generates keys derived therefrom to encrypt or decrypt network packets with packet encryption software onboard said network interface device wherein said network packets are captured and stored as Enhanced Packet Block (EPB) types in the packet capture next-generation (PcapNG) file format;

e. storing encrypted copies of said network packets as encrypted data blocks on board said network interface device, wherein said encrypted data blocks are stored as Encrypted Block (EB) types in the packet capture next generation (PcapNG) file format which includes a plain text key identifying serial number; and f. deriving computed encryption keys necessary to decrypt said encrypted network packets with third party analyst central processing unit hardware and software.

5. A process as set forth in claim 4 wherein said metadata stored as Flow Block (FB) types includes source and destination IP addresses and time stamp information.

\* \* \* \* \*